(12) United States Patent
Keyser et al.

(10) Patent No.: US 11,455,367 B1
(45) Date of Patent: *Sep. 27, 2022

(54) SYSTEMS FOR EXECUTING AN EDITOR APPLICATION FOR COMPOSING CONTENT OF A CONTENT MANAGEMENT SYSTEM

(71) Applicant: Contentful GmbH, Berlin (DE)

(72) Inventors: Benjamin Keyser, Berlin (DE); Martin Lehner, Berlin (DE); Paolo Negri, Berlin (DE); Richard Bausek, Berlin (DE)

(73) Assignee: Contentful GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,150

(22) Filed: Sep. 9, 2021

Related U.S. Application Data

(63) Continuation of application No. 17/201,348, filed on Mar. 15, 2021, and a continuation of application No. 17/201,492, filed on Mar. 15, 2021.

(51) Int. Cl.
| | |
|---|---|
| *G06F 16/958* | (2019.01) |
| *G06F 40/14* | (2020.01) |
| *G06F 8/38* | (2018.01) |
| *H04L 67/131* | (2022.01) |

(52) U.S. Cl.
CPC ............ *G06F 16/958* (2019.01); *G06F 8/38* (2013.01); *G06F 40/14* (2020.01); *H04L 67/131* (2022.05)

(58) Field of Classification Search
CPC . G06F 16/23; G06F 16/25; G06F 9/54; G06F 3/0482; G06F 16/958; G06F 8/38; G06F 40/14; H04L 67/131
See application file for complete search history.

(56) References Cited

U.S. PATENT DOCUMENTS

| | | | | |
|---|---|---|---|---|
| 7,287,218 B1* | 10/2007 | Knotz | ............... | G06Q 10/10 715/209 |
| 2005/0022129 A1* | 1/2005 | Borenstein | ............. | G06F 9/451 715/734 |
| 2006/0085765 A1* | 4/2006 | Peterson | ............... | G06F 3/0482 715/853 |
| 2007/0097138 A1* | 5/2007 | Sorotokin | ............... | G06T 15/00 345/581 |
| 2011/0191702 A1* | 8/2011 | Lunsford | ............... | G06F 3/048 715/763 |

(Continued)

*Primary Examiner* — Aleksandr Kerzhner
*Assistant Examiner* — Maher N Algibhah
(74) *Attorney, Agent, or Firm* — Penilla IP, APC

(57) ABSTRACT

A process for rendering a user interface for editing content of a content management system (CMS), includes: providing, over a network through a browser of a client device the user interface, the user interface is configured for editing a content page in the CMS; presenting a graphical tree view in the user interface that presents content components, wherein the graphical tree view of the content page provides a parallel structure to content presentation of a website page that implements API calls to the CMS for accessing content edited for the content page; and presenting an editing view in the user interface responsive to selection of one of said plurality of content components from the graphical tree view; wherein the editing view presented maintains a correlation to a relationship position of the selected content component in the logical hierarchy defined for the content page.

19 Claims, 17 Drawing Sheets

(56) References Cited

U.S. PATENT DOCUMENTS

| | | |
|---|---|---|
| 2015/0026260 A1 | 1/2015 | Worthley |
| 2016/0349949 A1* | 12/2016 | Miller .............. H04N 21/44222 |
| 2017/0249323 A1 | 8/2017 | Truitt et al. |
| 2019/0163728 A1* | 5/2019 | Koren ................... G06F 40/137 |
| 2020/0012623 A1* | 1/2020 | Cole ................... G06F 21/6209 |

* cited by examiner

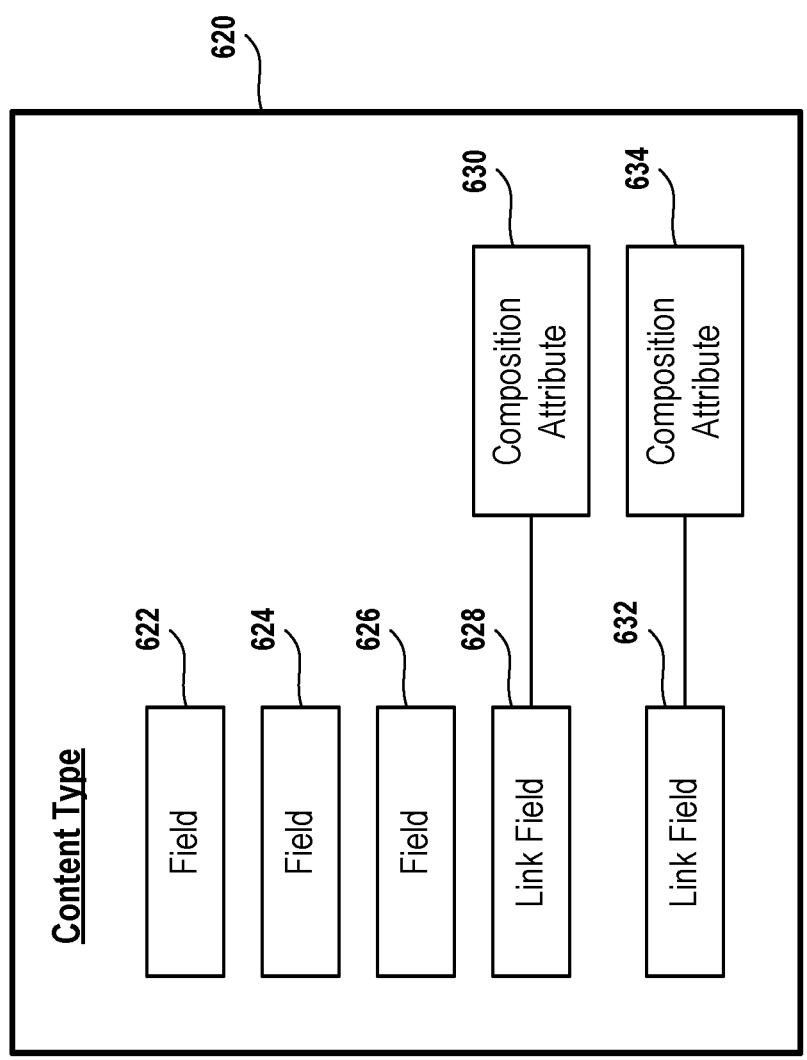

| | | 1000 | | | |
|---|---|---|---|---|---|
| ⭐ Learning center | | | | | ®RS▸ |
| C Help Center | ≡ | 🏠 Space home  ◆ Content model  📄 Content  🖼 Media  🔷 Apps ▸  ⚙ Settings ▸  🔍  ❓ | | | |
| ✏ Content ❓ | | Content type | Any ▸ | Type to search for entries  ≡ Filter | Save as view  Add entry ▸  ⚙ |
| ⏰ Scheduled Content | | ☐ | Name — 1002 | Updated ▲ | Author | Status |
| | | ☐ | contentful-overview | Jun 25, 2020 | John G. | Published |
| Shared views | My views | ☐ | Getting started | Jun 24, 2020 | Rachel S. | Published |
| All — 1004 | | ☐ | contentful-web-app-overview | Jun 24, 2020 | Rachel S. | Published |
| ▾ Content Type (11) | | ☐ | change-name | Jun 24, 2020 | Rachel S. | Published |
| Help Center - Index | | ☐ | user-profile | Jun 24, 2020 | Rachel S. | Published |
| Help Center - Category | | ☐ | Can I embed the Contentful web app as an iframe? | Jun 23, 2020 | Mary M. | Published |
| Help Center - Article | | | | | | |
| Help Center – Article Group | | ☐ | How to handle tables in Rich Text Field? | Jun 23, 2020 | Mary M. | Published |
| Help Center – Microcopy | | ☐ | Can records be shared between spaces/organizations? | Jun 23, 2020 | Mary M. | Published |
| Help Center – FAQ Entry | | | | | | |
| Help Center – Content Tag | | ☐ | How to reduce the loading time of my website? | Jun 23, 2020 | Mary M. | Published |
| Help Center – Code Snippet | | | | | | |
| Help Center – Banner | | ☐ | How to find a Contentful developer? | Jun 23, 2020 | Mary M. | Published |
| Help Center – Table | | | | | | |
| ➕ Add Folder | | ☐ | How to import content | Jun 23, 2020 | Mary M. | Published |

C ★ Learning Center  ≡
  Help Center

| 🅐 Media | ❓ |

Shared views   My views

🅐 Media  |  🏠 Space home  |  ⬡ Content model  |  ✎ Content  |  🅐 Media  |  🧩 Apps ▾  |  ⚙ Settings ▾  |  ♀  |  ❓  |  ⓇⓈ ▸

Type to search for assets

| ≡ Filter | Save as view |  | Add Asset |

— 1200

177 assets found — 1202    Usage: 594 / 500000 entries and assets

| | Prev... | Name | Dimensions | Type | Updated | By | Status |
|---|---|---|---|---|---|---|---|
| ☐ | ☐ | entry-editor | 2560 x 167... | Image.png | a few second... | Me | Published |
| ☐ | ☐ | Contentful web app ov... | 2728 x 180... | Image.png | 4 minutes a... | Me | Published |
| ☐ | ☐ | manage tags permission | 1195 x 587 px | Image.png | Tue, 2:11 PM | Me | Published |
| ☐ | ☐ | search-tags-columns | 1674 x 599 px | Image.png | Tue, 1:58 PM | Me | Published |
| ☐ | ☐ | tags-bulk-editor | 2430 x 126... | Image.png | Jun 26, 2020 | Me | Published |
| ☐ | ☐ | add-remove-tags-option | 1912 x 836 px | Image.png | Jun 19, 2020 | Malin Sofrone | Published |
| ☐ | ☐ | add-new-environment | 500 x 323 px | Image.png | Jun 11, 2020 | Me | Published |
| ☐ | ☐ | content-preview-disco... | 500 x 306 px | Image.png | Jun 11, 2020 | Me | Published |
| ☐ | ☐ | content-preview | 500 x 322 px | Image.png | Jun 11, 2020 | Me | Published |
| ☐ | ☐ | final-preview | 500 x 384 px | Image.png | Jun 11, 2020 | Me | Published |
| ☐ | ☐ | tags-entry | 2444 x 756... | Image.png | Jun 10, 2020 | Me | Published |

All

▾ Status (4)
  Published
  Changed
  Draft
  Archived

▸ File Type (12)
  Attachment
  Plain text
  Image
  Audio
  Video
  Rich text ⊞ Add Folder

Fig. 13

SYSTEMS FOR EXECUTING AN EDITOR APPLICATION FOR COMPOSING CONTENT OF A CONTENT MANAGEMENT SYSTEM

CLAIM OF PRIORITY

This application claims priority as a continuation and the benefit of U.S. patent application Ser. No. 17/201,492 filed on Mar. 15, 2021, entitled "Systems for Executing an Editor Application for Composing Content of a Content Management System," and claims priority as a continuation of U.S. patent application Ser. No. 17/201,348 filed on Mar. 15, 2021, entitled "Methods for Executing an Editor Application for Composing Content of a Content Management System," the disclosures of which are incorporated herein by reference in their entirety for all purposes.

BACKGROUND

1. Field of the Disclosure

The present disclosure relates to an editor application for composing content of a content management system.

2. Description of the Related Art

A content management system (CMS) provides many benefits by allowing users to flexibly structure and manage content, independent of the presentation of such content through various contexts such as websites and mobile apps. Content can be composed in a modular format, enabling an individual piece of content to be created once, and then reused across different presentation contexts. Further, the appearance of content can be adjusted to suit the presentation context at the time it is retrieved and presented to the consuming end user.

However, while this separation of content from its presentation context provides many advantages, the editorial experience may suffer as a result, as content editors and creators working in the CMS may be required to mentally keep track of how a given specific piece of content they are editing logically or organizationally fits with other pieces of content in a given content project.

It is in this context that implementations of the disclosure arise.

SUMMARY

Implementations of the present disclosure include methods and systems relating to an editor application for composing content of a content management system. The editor application is configured to provide interfaces that present a graphical tree view displayable when editing is processed for a content page. The graphical tree view identifies content components arranged to expose the logical hierarchy of components edited to be part of the content page. In one example, the graphical tree view exposes the contextual relationship of content being edited to other content of the content page.

In some implementations, a method for editing content of a content management system (CMS) is provided, including: providing, over a network to a client device, an editor application, said editor application providing an interface for editing a content page in the CMS, said content page associated with a plurality of content components referenced in the content page, where each content component of the plurality of content components being arranged in accordance with a logical hierarchy defined for the content page; generating a graphical tree view displayable via the interface for editing the content page, the graphical tree view presents content components in accordance with the logical hierarchy of the content page, wherein each of said content components is selectable via the graphical tree view; and generating an editing view in the interface responsive to selection of one of said plurality of content components from the graphical tree view, the editing view provides access to editing fields related to said selected content component; wherein the editing view and the graphical tree view are presented simultaneously in the interface, such that the editing view presented maintains a correlation to a relationship position of the selected content component in the logical hierarchy defined for the content page.

In some implementations, the method further includes, determining for each content component a relationship of the content component to the content page; identifying the content component as being external to the content page based on the relationship; restricting expansion of the graphical tree view for the content component.

In some implementations, the method further includes, determining for each content component a relationship of the content component to the content page; identifying the content component as being internal to the content page based on the relationship; enabling expansion of the graphical tree view for the content component.

In some implementations, the graphical tree view enables a selectable expansion view and a selectable contraction view, wherein the selectable expansion view when active presents one or more nested content components, and each of said nested content components is selectable; wherein selection of a nested content component automatically presents the editing view that corresponds to the selected nested content component.

In some implementations, the interface for editing the content page in the CMS is a graphical user interface that enables access to the graphical tree view of the content page for selecting one or more of the content components, and said section of one of said content components causes rendering of the editing view alongside the graphical tree view.

In some implementations, selection of another one of said content components causes updates the editing view to relate to said other selected content component.

In some implementations, the graphical tree view of the content page provides a parallel structure to content presentation of a website page, the website is configured to implement application programming interface (API) calls to the CMS for accessing content edited for the content page.

In some implementations, the parallel structure of the content page to the content presentation of the website exposes logical relationships between content components for when data associated with the content components is presented in the content presentation of the website page.

In some implementations, the logical relationships are provided from said logical hierarchy defined for the content page, and wherein the logical hierarchy is updated over time when content components are added, removed or moved when editing the content page.

In some implementations, the interface of the CMS provides each of said editing views for respective content components for adding, arranging and inputting data using input controls provided by the editing views.

In some implementations, a content management system (CMS) is provided, including: a plurality of servers configured to execute operations of the CMS, the CMS is connected to a network for providing access to a client device, and an editor application, wherein the editor application provides an interface for editing a content page in the CMS, and said content page is associated with a plurality of content components referenced in the content page, and each content component of the plurality of content components is arranged in accordance with a logical hierarchy defined for the content page; a server of the plurality of servers is configured to generate a graphical tree view displayable via the interface for editing the content page, the graphical tree view presents content components in accordance with the logical hierarchy of the content page, wherein each of said content components is selectable via the graphical tree view; and, a server of the plurality of servers is configured to generate an editing view in the interface responsive to selection of one of said plurality of content components from the graphical tree view, the editing view provides access to editing fields related to said selected content component; and, a server of the plurality of servers is configured to transmit the user interface to the client device, the user interface includes the editing view and the graphical tree view presented simultaneously, such that the editing view presented maintains a correlation to a relationship position of the selected content component in the logical hierarchy defined for the content page.

In some implementations, a server of the plurality of servers is configured to determine for each content component a relationship of the content component to the content page, identify the content component as being external to the content page based on the relationship, and restrict expansion of the graphical tree view for the content component.

In some implementations, a server of the plurality of servers is configured to determine for each content component a relationship of the content component to the content page, identify the content component as being internal to the content page based on the relationship, and enable expansion of the graphical tree view for the content component.

In some implementations, the graphical tree view enables a selectable expansion view and a selectable contraction view, wherein the selectable expansion view when active presents one or more nested content components, and each of said nested content components is selectable; wherein selection of a nested content component automatically presents the editing view that corresponds to the selected nested content component.

In some implementations, the interface for editing the content page in the CMS is a graphical user interface that enables access to the graphical tree view of the content page for selecting one or more of the content components, and said section of one of said content components causes rendering of the editing view alongside the graphical tree view.

In some implementations, selection of another one of said content components causes updates the editing view to relate to said other selected content component.

In some implementations, the graphical tree view of the content page provides a parallel structure to content presentation of a website page, the website is configured to implement application programming interface (API) calls to the CMS for accessing content edited for the content page.

In some implementations, the parallel structure of the content page to the content presentation of the website exposes logical relationships between content components for when data associated with the content components is presented in the content presentation of the website page.

In some implementations, the logical relationships are provided from said logical hierarchy defined for the content page, and wherein the logical hierarchy is updated over time when content components are added, removed or moved when editing the content page.

In some implementations, the interface of the CMS provides each of said editing views for respective content components for adding, arranging and inputting data using input controls provided by the editing views.

In some implementations, a method for editing content of a content management system (CMS) is provided, including: providing, over a network to a client device, an editor application, said editor application providing an interface for editing a content page in the CMS, said content page associated with a plurality of content components referenced in the content page, where each content component of the plurality of content components being arranged in accordance with a logical hierarchy defined for the content page; generating a graphical tree view displayable via the interface for editing the content page, the graphical tree view presents content components in accordance with the logical hierarchy of the content page, wherein each of said content components is selectable via the graphical tree view; determining for each content component a relationship of the content component to the content page; responsive to identifying the content component as being external to the content page based on the relationship, then restricting expansion of the graphical tree view for the content component; and responsive to identifying the content component as being internal to the content page based on the relationship, then enabling expansion of the graphical tree view for the content component.

In some implementations, the method further includes: generating an editing view configured to provide access to editing fields related to the content component; further responsive to the identifying the content component as being external to the content page based on the relationship, then restricting expansion of the editing view for the content component; further responsive to the identifying the content component as being internal to the content page based on the relationship, then enabling expansion of the editing view for the content component.

In some implementations, the editing view and the graphical tree view are presented simultaneously in the interface, such that the editing view presented maintains a correlation to a relationship position of the content component in the logical hierarchy defined for the content page.

In some implementations, the graphical tree view enables a selectable expansion view and a selectable contraction view, wherein the selectable expansion view when active presents one or more nested content components, and each of said nested content components is selectable to automatically present an editing view that corresponds to the selected nested content component.

In some implementations, the graphical tree view of the content page provides a parallel structure to content presentation of a website page, the website is configured to implement application programming interface (API) calls to the CMS for accessing content edited for the content page.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 6B conceptually illustrates a content type having link type fields with associated composition attributes, in accordance with implementations of the disclosure.

FIG. 7C illustrates the editor UI with the editor view 720 scrolled to reveal additional sections, in accordance with the implementations of FIGS. 7A and 7B.

FIG. 8 illustrates an editor UI view of page settings for a CMS page, in accordance with implementations of the disclosure.

FIG. 10 illustrates an interface view of a Content tab of a CMS editorial application, in accordance with implementations of the disclosure.

FIG. 11 illustrates an interface view of an entry editor of a CMS editorial application for adding a new entry to a content project/environment, in accordance with implementations of the disclosure.

FIG. 12 illustrates an interface view of a Media tab of a CMS editorial application, in accordance with implementations of the disclosure.

FIG. 13 illustrates an interface view of an Asset editor of a CMS editorial application for editing an Asset, in accordance with implementations of the disclosure.

DETAILED DESCRIPTION

Figure 1:
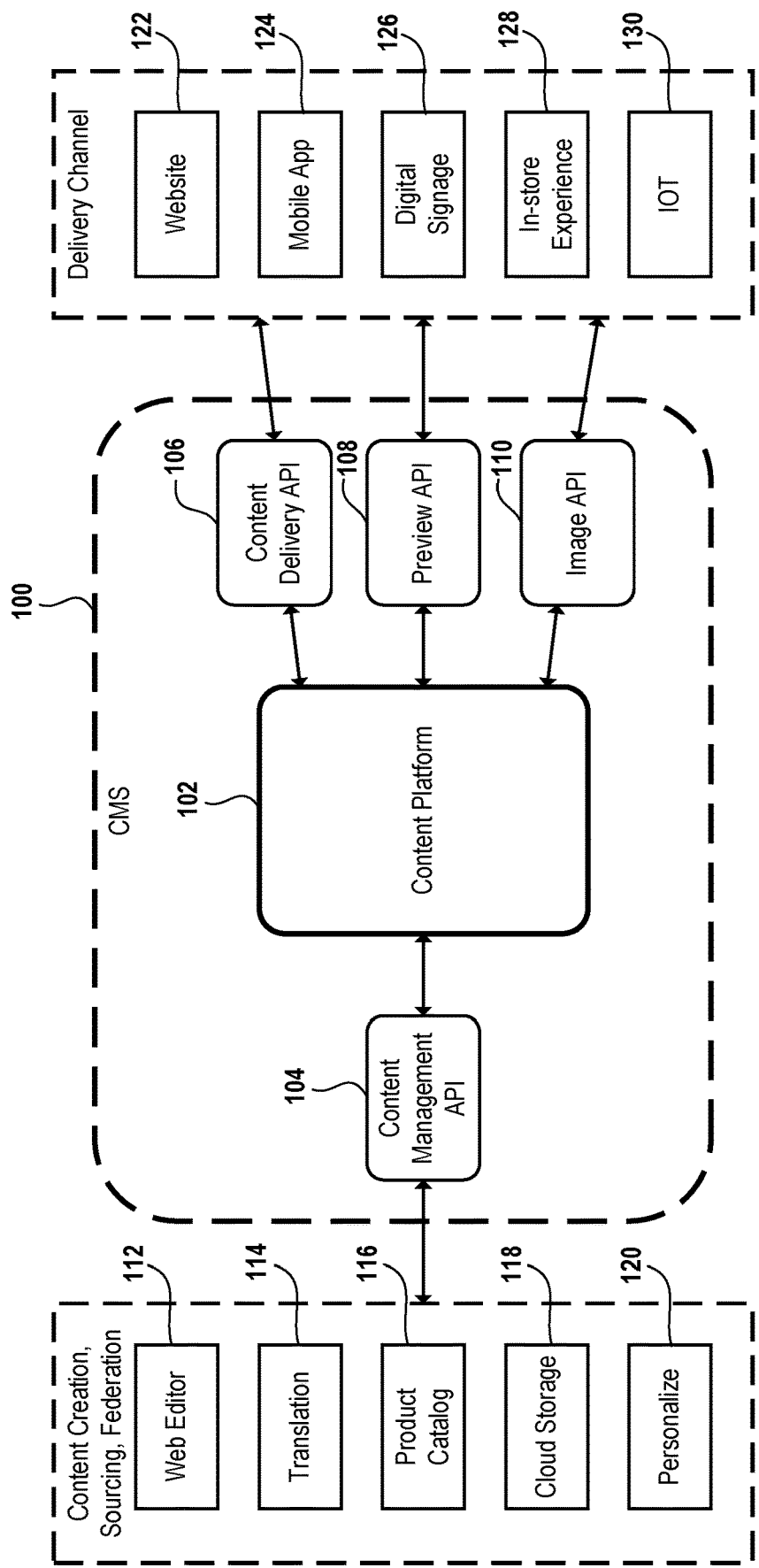
FIG. 1 conceptually illustrates a content management system (CMS) 100, and entities that interact with the CMS 100, in accordance with implementations of the disclosure.

The following implementations of the present disclosure provide methods, and systems relating to an editor application for editing content of a content management system. A CMS page is composed using a flexible content modeling architecture that uses entries that are defined and referentially nested so as to enable intuitive access and editing of content in the CMS. In one embodiment, in a compose mode, a graphical tree view is generated for editing a content page. The graphical tree view presents content components in accordance with a logical hierarchy of the content page, wherein each of said content components is selectable via the graphical tree view.

It will be obvious, however, to one skilled in the art, that the present disclosure may be practiced without some or all of the specific details presently described. In other instances, well known process operations have not been described in detail in order not to unnecessarily obscure the present disclosure.

Implementations of the present disclosure are drawn to a content editing system and method, which enables editors of content of a content management system (CMS) to edit content of a page defined in the CMS, while continually being aware of the broader context in which the current content fits within the logical structure of the page. Existing CMS editing applications that interface with a CMS may allow editing of content, but it can be easy for editors to lose context of what they are editing, as the structuring of content within a page can be very complex, and may include nested structures that result in a complex logical hierarchy with many tiers. Existing CMS editing applications that simply provide access to each content piece individually, or render new tabs or overlays when accessing different pieces of content, do not provide intuitive mechanisms to inform editors of their contextual location for content being edited.

In view of the above problems, implementations of the present disclosure provide an editorial interface for a CMS having a tree/directory view that provides intuitive display of the logical relationships among content of a page, including multiple levels of nested structures. This enables editors to quickly and easily comprehend the context of a given piece of content, and access content pieces directly for editing. Furthermore, the editorial interface is configured to distinguish between compositional content of the page, and non-compositional content that stands on its own apart from the page. This aspect is facilitated by an attribute field added to content references, as described in further detail below.

Implementation of this attribute field further enables a customized default view presenting the tree-directory adjacent to corresponding content editing windows, with compositional and non-compositional content of the page being handled differently so as to communicate to the editor at a glance the nature of a given piece of content and its relationship to the page. By modeling a page of content in this manner in the CMS, such a setup preserves the independence of content from context, while providing intuitive editing so that editors accessing the CMS can more easily appreciate the logical context of content that they are editing.

FIG. 1 conceptually illustrates a content management system (CMS) 100, and entities that interact with the CMS 100, in accordance with implementations of the disclosure.

Broadly speaking, a content management system (CMS) is a system that facilitates and manages the creation, storage, editing, and delivery of digital content. One example of a CMS is provided by Contentful GmbH (https://www.contentful.com). In a CMS in accordance with implementations of the disclosure, content can be distinguished from the context/channel in which such content is presented. That is, content is modularized and separated from its appearance in a given presentation context through which the content is presented and actually consumed by the end user. Examples of presentation contexts include websites, mobile apps, digital signage, in-store digital experiences, etc.

Content generally consists of content items which can be of various types. Examples of types of content items include text, images, audio, video, data values, etc. Content items are typically stored as data structures in the CMS (e.g. JSON data structures containing text, metadata, links, tags, etc.), and in some implementations, include raw text, media, or data files. Hence, content is stored and delivered in a generic format, and formatting is later applied in the end application that defines the presentation context. For example, appearance determinations such as fonts, colors, alignment, etc. are applied to text or media content items by a website or mobile app. Thus, the final appearance of content is not determined at its creation, but rather is dynamically determined by the context in which the content will appear.

Content items can be flexibly configured to enable specific content items for specific purposes to be defined. For example, the content items which comprise a typical rendering of a news article by a newspaper/publication may include the following: title of the newspaper/publication, place/location, date, copyright information, article title, subtitle, author, body, photo/image, photographer name, photo/image caption, etc. Each of these content items can be separately stored and independently delivered as needed to suit different contexts of presentation. For example, a news article appearing on a news website will be configured to present the article in a different format/style than when the same article appears in a social media feed, on a digital sign, or in another context.

Broadly speaking, the CMS 100 provides a content platform 102 to unify and structure content for improved content management and delivery. Access to and management of the content is provided through various application programming interfaces (API's). In some implementations, creation, editing, federation and other management of content is mediated through a content management API 104. In some implementations, the content management API 104 is a read-write API for managing content. In some implementations, the content management API 104 requires authentication as a user of the CMS. The content management API 104 enables one to programmatically create or update content items. It will be appreciated that the content management API 104 can be used for a variety of purposes, including by way of example without limitation, creation and editing of content in the content platform, automatic imports from other content sources/repositories, integration with other backend systems (e.g. an e-commerce shop), building custom editing experiences, etc.

For example, a web editor 112 is implemented to provide a web-based user interface for creating and editing content, the web editor accessing the content management API to generate new content items in the system, retrieve and edit existing content items, store changes to content items, etc.

In some implementations, content is localized in part by translation logic 114, which enables translation (in some implementations, causes translations) of the content into the local language of the delivery context. Thus, translation logic 114 may access the content management API 104 to retrieve, generate, and store translations of content in the CMS 100, as well as configure such translations for presentation in the appropriate contexts.

In some implementations, the content platform 102 of the CMS 100 can be integrated with other systems via the content management API 104. In some implementations, content can be sourced/mined/imported from, or synchronized with, an existing repository of content. For example, an existing product catalog 116 may be maintained including information about products such as product names, categorizations, descriptions, price information, related media, etc. and such a product catalog system can be configured to import or update content, or otherwise effect content management actions so as to integrate with the CMS 100 via the content management API 104. In some implementations, a cloud storage system 118 can similarly integrate with the CMS 100 via the content management API 104.

In some implementations, a personalization system 120 is enabled to effect content personalization via the content management API 104. Personalization information can be utilized to enable customization of content or downstream customization of content delivery. Examples of personalization information can include user demographic information (e.g. age, gender, ethnicity, etc.), geolocation, user content consumption history, user preference information, user purchase history, etc. Such personalization information can be utilized by the personalization system 120 to customize content via the content management API, and the selection and presentation of content through a given context.

As noted, content is separated from its presentation, so that the specific appearance of delivered content is determined by or otherwise based on the downstream context/channel through which the content is delivered (e.g. website, mobile app, digital signage, in-store experience, etc.). To this end, various API's are provided for enabling such presentation contexts/channels to access the CMS to obtain the appropriate content for presentation. For example, a content delivery API 106 is exposed to enable retrieval of content items and delivery of said content items to the presentation context. In some implementations, the content delivery API 106 is configured as a read-only API for delivering content from the CMS 100 to apps, websites and other media. In some implementations, content can be delivered as JSON data, and images, videos and other media as files. The content delivery API 106 can be made available via a globally distributed content delivery network (CDN), so that the server closest to the user serves all content, both JSON and binary. This minimizes latency, which especially benefits potentially bandwidth constrained delivery contexts, such as mobile apps. Hosting content in multiple global data centers also greatly improves the availability of content.

In some implementations, a content preview API 108 is provided, which is a variant of the content delivery API 106 for previewing content before delivering it to live customers. The content preview API 108 can be used in combination with a preview deployment, e.g. preview deployment of a website or a preview build of a mobile app, that allows content managers and authors to view their work in-context, as if it were published, using a preview access token as though it were delivered by the content delivery API 106.

In some implementations, an images API 110 is provided, enabling image transformations/adjustments, such as resizing and cropping of images, changing their background color and converting them to different formats. Using the images API 110 for these transformations allows users to upload high-quality assets, while delivering images suitable and optimized for the delivery channel, and leveraging the benefits of a caching content delivery network.

It will be appreciated that content can be delivered from the CMS 100 to any of various delivery channels/contexts, such as a website 122, mobile app 124, digital signage 126, in-store experience 128, Internet-of-things (IOT) device 130, etc.

In some implementations, the CMS 100 is configured to have the following main entity types: user, organization, space, and environment.

A user is an entity with an account in the CMS. Users can be invited to an existing organization, or sign up individually. If a user has signed up individually, a new organization is automatically created. An existing user can create additional organizations or be invited to other existing organizations. In some implementations, users have management authentication credentials attached to them, such as OAuth applications, OAuth tokens, and personal access tokens.

An organization is an entity that serves as a way to group users and group spaces (content projects). In some implementations, the organization also links member users to a billing entity, so subscriptions and invoices are tied to the organization, rather than to a specific user.

In some implementations, the CMS implements a role-based access model. For example, users can be invited to join an organization and those users will have different levels of access based on their organizational role.

In some implementations of the CMS, a space or a content project is a child of the organization, and serves as a container for the organization's content and any settings related to that content. Spaces allow one to separate data according to the structure of projects or services.

Various settings can apply to a given space or content project. For example, users of a space can be defined as members of the parent organization who belong to the space, and their respective access roles can be defined. Roles and permissions can be defined to set user access levels within the space. API keys can be defined, so that in order to retrieve content through one of the CMS's APIs, a key has to be provided for authentication. For example, in some implementations, an API key is required to be provided in order to access published content through the content delivery API or to access unpublished content through the preview API. Webhooks can be configured to send requests (e.g. HTTP requests) triggered by changes to a content model, content, or media. Content preview functionality is supported, providing a link within the entry editor to a pre-production environment that uses the preview API to access unpublished content.

In some implementations of the CMS, environments are defined as entities within a space that allow one to create and maintain multiple versions of the space-specific data and configuration, and make changes to them in isolation. Hence, in some implementations, each space has one environment by default, which may be termed a master environment. Additionally, multiple sandbox environments can be created. These sandbox environments allow one to modify the data in a space without affecting the data in the master environment. In some implementations, an environment alias can be implemented to allow one to access and modify the data of a target environment, through a different static identifier. For example, a master alias ID can be implemented to reference or point to the environment that is deemed to be the current production version, and accordingly API calls using the master alias ID will access the referenced environment. It will be appreciated that the master alias ID can be easily switched to another environment as needed, conveniently facilitating rollout of a new version of content or rollback to a prior version.

In some implementations, environments include a content model, content, and media. The content model is a collection of content types, which define the structure of the content. The content is defined as a collection of entries. Media is defined as a collection of assets.

A plurality of settings can apply to environments. For example, in some implementations, there are locales settings to manage and deliver content in multiple languages, or otherwise customize content delivery based on delivery geo-location. In some implementations, user interface (UI) extensions are supported, to enable building of customized editing experiences for the web editor. In some implementations, app installations are supported, extending and expanding the capabilities of the CMS web application.

Figure 2:
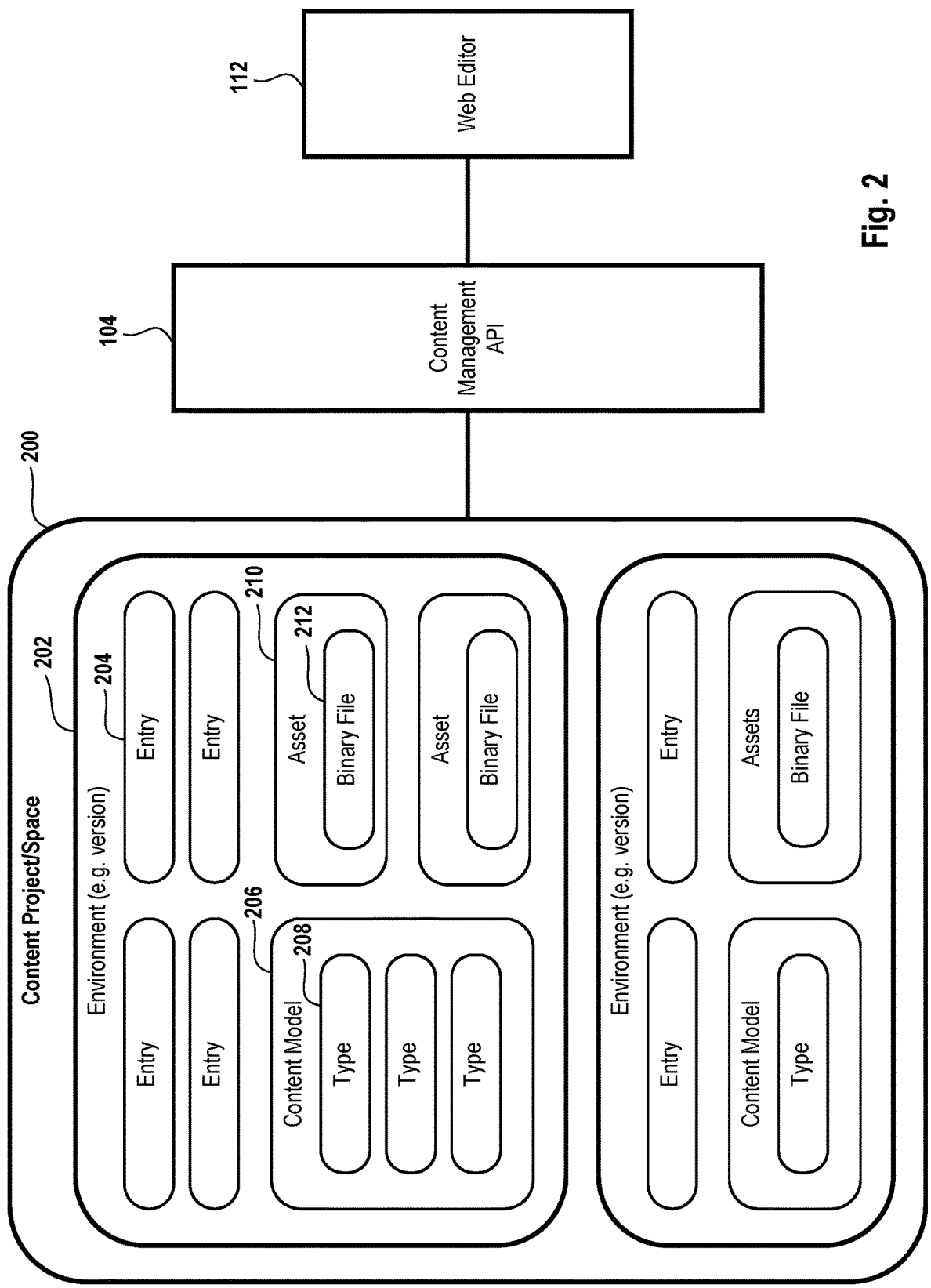
FIG. 2 conceptually illustrates a content project (also termed a space), in accordance with implementations of the disclosure.

FIG. 2 conceptually illustrates a content project (also termed a space), in accordance with implementations of the disclosure.

In the illustrated implementation, content is organized in content projects, such as an exemplary content project 200, that groups together all the related resources for a given project. This can include content entries, media assets, and settings for localizing content into different languages. Each content project has a content model that represents and defines the content types one can create for the content project.

In some implementations, all content types have standard fields that contain basic information about the content type, its fields and meta data (e.g. system properties, name of the content type, description of the content type, listing of fields, ID of main field used for display, etc.). Each content type is flexibly configurable, further consisting of user-defined fields, which in some implementations, correspond to a JSON type (e.g. string, number, object, boolean, array). Examples of user-defined fields include the following: text, number, date and time, location (coordinates), boolean, media (links to an asset), reference (links to an entry or object), array, JSON object. It will be appreciated that array fields can contain multiple values which can include strings, links to other entries or assets, etc. An array field may have an items property defining the allowed values in the array. Individual fields can also contain metadata, such as validations and widget appearance.

Individual items of content are stored in the CMS as entries (e.g. entry 204), which represent textual or structural information based on the content type used. Items can also be assets (e.g. asset 210), which can include binary files (e.g. binary file 212), such as images, videos or documents, along with metadata. In some implementations, assets have the following fields: the name, description and attached file.

In summary, a content project contains all the content that is functional to one project, and an environment is a way to express one version of one project. An example use case for multiple environments as part of a given content project would be a scenario in which there is a current version of one's website and a future holiday version of the website that is not in production yet, but being worked on. There can be a first environment that contains the content for the current version being actively served to customers, while in parallel work is proceeding on a second environment which is for the future holiday version to be released.

Further, content in a given environment of a content project consists of entries and assets, with each entry being of a user-defined type that specifies the fields of a given entry. Thus, each entry is a unit of content in the system of a type that is flexibly defined by the user and capable of being adapted to suit a given purpose.

For purposes of illustration, an example of a content model for a product catalogue might include content types for a category (identifying what product type), a brand (identifying who made the product), and a product (an item for sale that references a category and a brand). Further, the brand content type might consist of several fields, such as a company name, logo, description, electronic contact information (website, social media, email address), phone number, etc.

Entries can have link (or reference) fields which point to other entries or assets. An example use case for a restaurant might include the following: a restaurant linking to its menu (singular relationship), a menu linking to its specific menu items (plural relationship), each menu item linking to a photo (attachment), a restaurant linking to multiple photos (attachments). The content delivery API can be structured so that a single HTTP request retrieves the entire set of linked resources above, starting with the menu, in one request. A CDN can cache these requests to further speed up future requests. This is useful for consuming apps (and especially mobile apps) as it reduces the need for multiple concurrent connections or servicing of serially dependent requests, and reduces the latency for results to return.

Links also provide additional advantages in that relationships are clearly defined and validated by specific content type fields. Entry links can be validated by content type (e.g. only allow Menu Items for fields.menuItems). Asset links can be validated by file type. (e.g. only allow Images for fields.photo). Links on the Content Delivery API are resolved using the published entries and assets, while links on the Content Preview API will resolve using the draft entries and assets.

Figure 3:
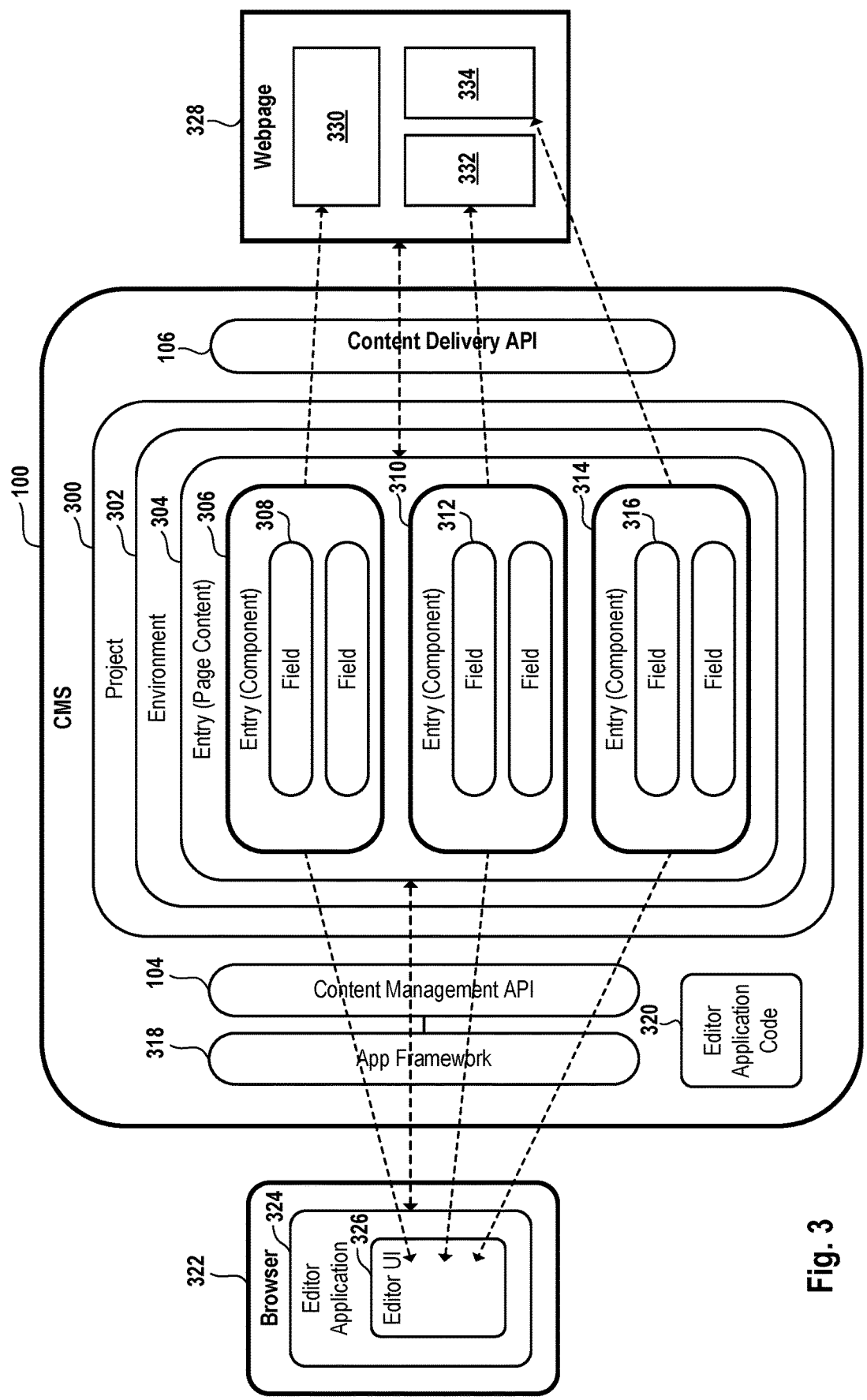
FIG. 3 conceptually illustrates a system for editing a page of content in a CMS, and rendering the page of content as a webpage, in accordance with implementations of the disclosure.

FIG. 3 conceptually illustrates a system for editing a page of content in a CMS, and rendering the page of content as a webpage, in accordance with implementations of the disclosure.

The concept of a page in the CMS 100 is now introduced. For purposes of the present disclosure, a page (or a CMS page, content page, or a page of content) in the CMS, is a set of data structures defined and stored in the CMS that identifies and organizes a collection of content. It will be appreciated that a CMS page is specific to the CMS 100, and is to be distinguished from other types of pages such as webpages and the like which may represent downstream presentation contexts. As implied by the naming convention, one significant use of a CMS page is to enable content editors using the CMS 100 to model the logical structure and organization of content that is to be presented in a webpage context. However, the CMS page is an independently defined organizational structure in the CMS 100 that can be applied to suit other use cases and presentation contexts. A significant advantage of the implementation of a CMS page is that it enables content editors to more easily appreciate the downstream presentation context of content that they are editing in the CMS 100, while still maintaining the independence of the content from its potential presentation contexts.

In some implementations, a CMS page is defined using the above-described flexible content modeling architecture, employing entries that are defined and referentially nested so as to enable intuitive access and editing of content in the CMS 100. More specifically, in some implementations, a CMS page is defined by a page definition entry, a page content entry that is referenced by the page definition entry, and additional entries further referenced (directly, or indirectly via nesting of entries) by the page content entry, which compose the content for the CMS page.

With continued reference to the implementation of FIG. 3, the CMS 100 is shown, including a content project 300, and an environment 302 defined within the content project 300, which as noted above can be defined to represent a version of the project 300. Within the environment 302, a page content entry 304 is defined for a given CMS page. The page content entry 304 is of a type that is configured to organize blocks or sections of content which may be deployed to a webpage or other presentation context.

The page content entry 304 can reference several component entries 306, 310, and 314, as shown, which represent the content blocks for a webpage 328, for example. Each component entry includes one or more fields, such as field 308 of component entry 306, field 312 of component entry 310, or field 316 of component 314. These fields may directly contain content (e.g. text, values, etc.) or reference content such as assets/media or reference additional entries.

The CMS 100 includes editor application code 320, that can be downloaded over a network to a client device, and executed, for example via a browser 322 of the client device, to define an editor application 324. The editor application 324 provides an editor user interface (UI) 326 enabling an editor to access and edit content of the CMS 100. The editor application 324 may access an application framework 318 that assists or enables the editor application 324 to access the entries of content project 300, such as by facilitating API calls to the content management API 104 to retrieve entries, submit changes to entries, etc.

When published, the component entries of the CMS page can be made available for rendering through a presentation context such as webpage 328. It will be appreciated that the logical structuring of entries referenced by the page content entry 304, and attendant fields and nested sub-entries, can be configured so as to approximate the logical structure of the intended presentation context, which in this case is that of the webpage 328. A web developer may configure the webpage 328 to present content in specific ways, adjusting appearance and layouts as necessary, but the logical structuring of the content according to a CMS page in the CMS 100 provides a hierarchical framework that can approximate the logical structure of the webpage 328, making it simpler for the web developer to author the webpage 328. In the illustrated implementation, the component entries 306, 310, and 314 are arranged at locations 330, 332, and 334 of the webpage 328, which can be spatially defined locations of the webpage 328 in some implementations.

The content for the webpage 328 is retrieved from the CMS 100, e.g. by a browser of a client device in which the webpage is rendered, via one or more API calls to the content delivery API 106. In some implementations, the webpage 328 is cached for delivery at the edge by a content delivery network (CDN), in which case the entries of the CMS page may be retrieved by a server of the CDN, again via API calls to the content delivery API 106.

Figure 4:
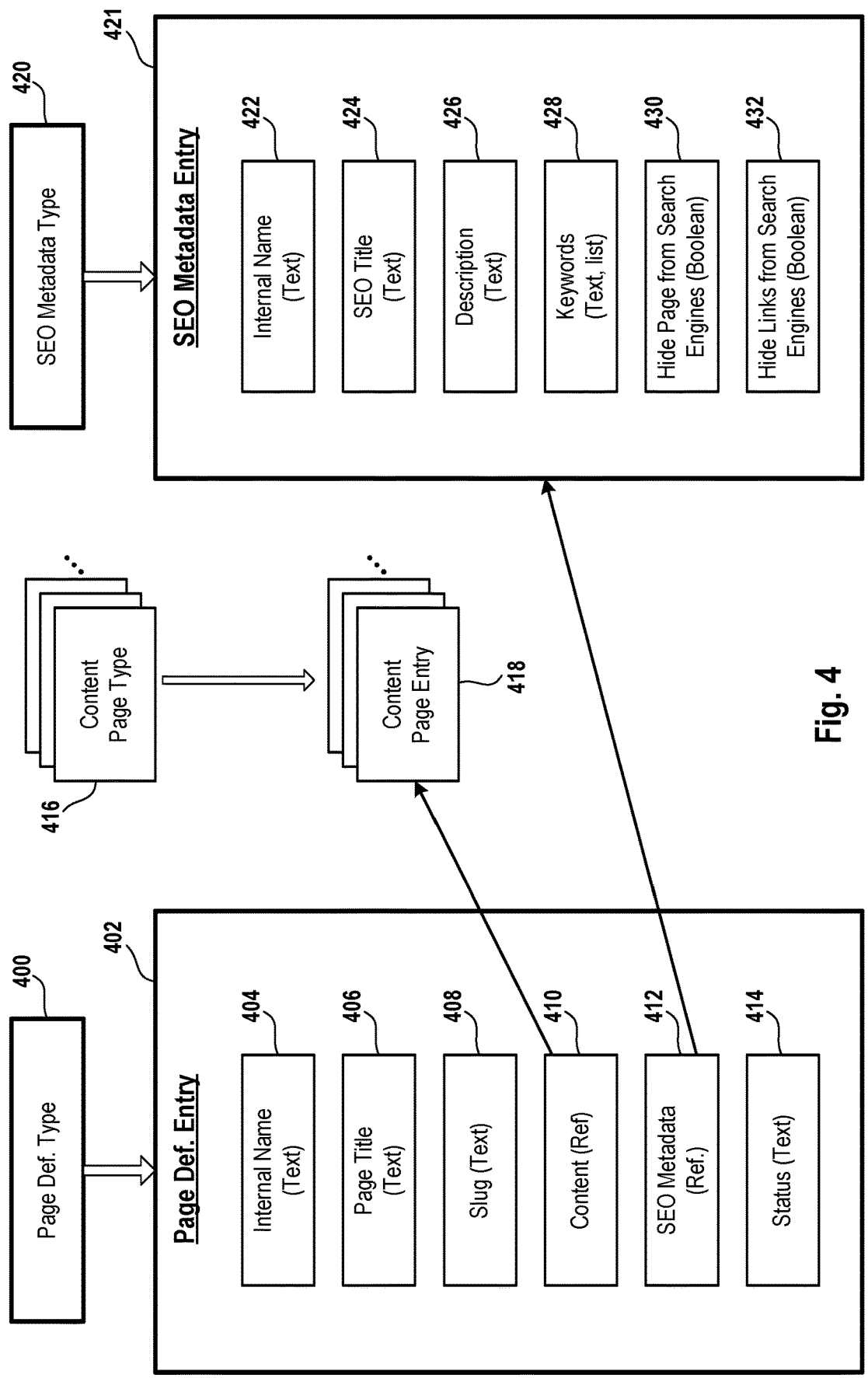
FIG. 4 conceptually illustrates various types of content entries utilized to define a CMS page, in accordance with implementations of the disclosure.

FIG. 4 conceptually illustrates various types of content entries utilized to define a CMS page, in accordance with implementations of the disclosure.

As noted above, entries in the CMS 100 can be defined from various predefined types that define the structure and nature of the entries. In the illustrated implementation, a page definition type 400 is used to define a page definition entry 402 for a given CMS page. The page definition entry 402 can represent a specific webpage on a website, in some implementations.

The page definition entry 402 is the root entry of the CMS page in the CMS 100, and is of the page definition type 400, configured to serve as a data entity containing common CMS page-related information such as title, slug, SEO metadata and the actual content. As shown, the page definition entry 402 includes various fields for the page-related information. While specific fields are described below, in some implementations, the system is configured to enable a user to create additional custom primitive fields for the page definition type 400 or the specific page definition entry 402. In some implementations, a user is enabled to remove unused fields with the exception of the internal name field, content field, and SEO metadata field.

An internal name field 404 is a text field containing the name of the CMS page, which can be used to identify the CMS page in a listing of CMS pages in the CMS 100.

A page title field 406 is a text field containing a title of the CMS page which in some implementations, can be displayed at the top of the webpage when published.

A slug field 408 is a text field containing the last part of the URL for the CMS page.

A content field 410 is a reference field that links a specific page content entry 418 to the page definition entry 402. The page content entry 418 referenced by the content field 410 represents the content to be shown on the given webpage.

The SEO (search engine optimization) metadata field 412 is a reference field that links the page definition entry 402 with SEO-related configuration information for the webpage. In the illustrated implementation, the SEO metadata field 412 references the related SEO metadata entry 421 that holds structured metadata about the webpage.

A status field 414 is a text field that can be updated automatically by the editor application and represents the page status based on the status of all entries linked on the page.

As noted above, the page definition entry 402 includes an SEO metadata field 412 that references the SEO metadata entry 421. The SEO metadata entry 421 is defined from an SEO metadata type 420, and contains SEO-related page metadata. This configuration provides a way to change metadata for each page, which can be utilized by an implemented frontend application. While specific fields as discussed below are defined within the SEO metadata type 420, in some implementations, the system is configured to enable a user to create additional custom primitive fields for the SEO metadata type 420 or the specific SEO metadata entry 421. In some implementations, a user is enabled to remove unused fields from the SEO metadata type, except for the internal name field.

In the illustrated implementation, the SEO metadata entry 421 includes an internal name field 422 which is a text field providing a display name for listing purposes in the CMS 100 and to enable distinguishing different SEO metadata entries. In some implementations, the internal name is autogenerated.

The SEO title field 422 is a text field configured to be a webpage title and be rendered in title meta-tags.

The description field 426 is a text field configured to be a webpage description and be rendered in description meta-tags.

The keywords field 428 is a text list field configured to contain page-related keywords.

The field 430 is a boolean field configured to indicate whether to hide the webpage from search engines.

The field 432 is a boolean field configured to indicate whether to hide links on the webpage from search engines.

It will be appreciated that the page definition entry 402 serves as a container in the CMS 100 to define and link information and content for the CMS page. As noted above, the content field 410 of the page definition entry 402 links to a specific page content entry 418. Accordingly, it will be appreciated that to create CMS pages, there can be one or more user-defined page content types (such as page content type 416) that are created and registered in the CMS 100. In some implementations, these page content types can be registered in the page definition type, to define the acceptable page content entry types which are suitable for the CMS page. By way of example without limitation, page content types could include a "Landing page" page content type, a "Help Center Article" page content type, a "Recipe page" page content type, etc., depending on the project model.

It will be appreciated that each page content type is customizable and can have a different structure and generally allows various available field types to be used as described above. It will be appreciated that reference fields allow one to link various entries of other content types that can serve as reusable building blocks for CMS pages.

After creation of a new page content type, a validation rule of the page definition type's content field is updated to include the new page content type in the list of allowed linkable page content types. This marks the created page content type as available for creating new pages. For example, the validation could be configured to accept content types representing the various example page content types above, e.g. "Landing page" or "Help Center Article" or "Recipe page". This can be used to determine the available page content types when creating new CMS pages in the CMS 100.

Figure 5:
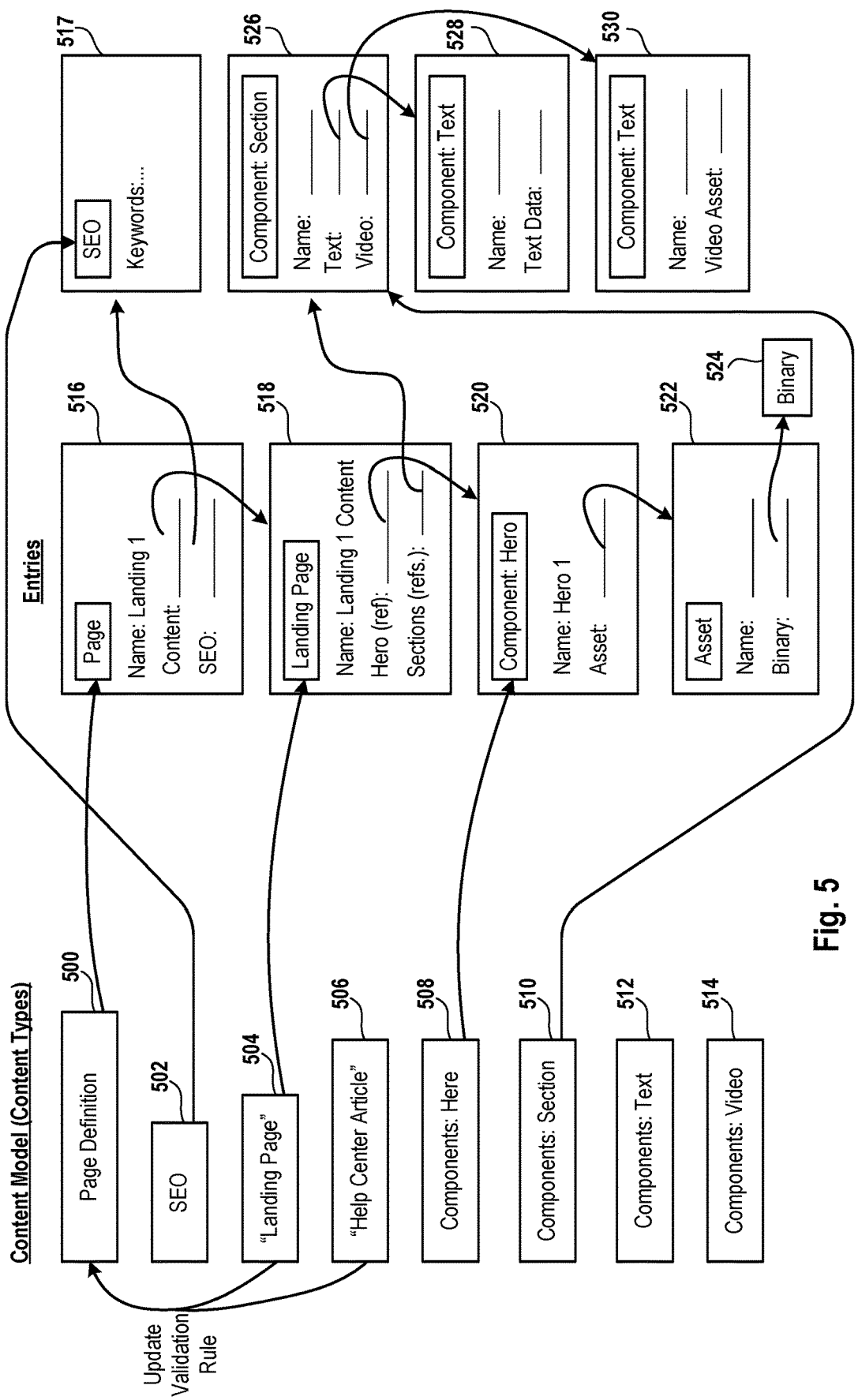
FIG. 5 conceptually illustrates an example collection of entries that collectively define an example CMS page in a CMS, in accordance with implementations of the disclosure.

FIG. 5 conceptually illustrates an example collection of entries that collectively define an example CMS (content) page in a CMS, in accordance with implementations of the disclosure.

Shown at left is a plurality of content types that define a content model for the CMS page. Various types are defined, including a page definition type 500, an SEO metadata type 502, a "Landing Page" page content type 504, and a "Help Center Article" page content type 506. By way of example without limitation, the "Landing Page" page content type can be configured to represent or model a landing page for a website. The "Landing Page" and "Help Center Article" page content types 504 and 506 are added to the page definition type 500 as part of the validation rule for the page definition type 500, meaning that the page content types 504 and 506 are acceptable page content types for the page definition type 500.

Furthermore, several additional content types are defined and configured as various component content types which can be referenced by a page content entry. Generally, such component content types can be configured to define various blocks or sections of content, or content components, for the CMS page. In the illustrated implementation, a "Component:Hero" content type 508, a "Component:Section" content type 510, a "Component:Text" content type 512, and a "Component:Video" content type 514 are defined as part of the content model.

It will be appreciated that the various content types can be utilized to define entries in the CMS 100 which collectively define a CMS page in the CMS. As shown in the illustrated implementation, a page definition entry 516 is defined having the page definition type 500. The page definition entry 516 references an SEO metadata entry 517 that is defined of the SEO metadata type 502. Further, a page content entry 518 is defined having the page content type 504 (the "Landing Page" page content type). The CMS page is configured to represent a landing page for a website, and accordingly, the content field of the page definition entry 516 references the "Landing Page" page content entry 518.

The "Landing Page" page content entry 518 further references various component content entries. In the illustrated implementation, the "Landing Page" page content entry 518 includes a field referencing a "Component:Hero" content entry 520, and also includes a field referencing a "Component:Section" content entry 526. The "Component:Hero" content entry 520 is defined from the "Component:Hero" content type 508, and is configured to represent, and identify content for, a hero section of the landing webpage.

As shown in the illustrated implementation, the "Component:Hero" content entry 520 further includes a field referencing an asset 522, which in turn references and identifies a binary 524. In some implementations, the binary 524 is an image or video that will be displayed in the hero section of the webpage.

In the illustrated implementation, the "Component:Section" content entry 526 is defined from the "Component: Section" content type 510. The "Component:Section" content entry 526 includes a field referencing a "Component: Text" content entry 528 that is defined of the "Component: Text" content type 512. The "Component:Section" content entry 526 further includes a field referencing a "Component: Video" content entry 530 that is defined of the "Component: Video" content type 514. By way of example without limitation, the "Component:Text" content entry 528 can be configured to include a text field containing text content. Similarly, the "Component:Video" content entry 530 can be configured to include a field containing a reference to video content such as an identifier (e.g. url) of video content or a stored video asset or binary.

As indicated in the illustrated implementation, content is represented by different page content types, where each type can have a different set of fields. In the case of the illustrated example, the page content types are "Landing page" and "Help Center Article". Each page definition entry with its content field linked to a specific page content type can represent a page on a website. By utilizing reference fields and reusable components linked to these fields, one can model the structure of a given webpage.

For example in accordance with the above, a standard landing page might have a hero block and sections like a video or subtitle beneath the hero block. To model such a landing page, a single reference field hero and multiple references field sections can be added to the "Landing page" content type. To represent the actual content on a page, a few component content types are created. For the landing page, these could be "Component: Hero", "Component: Section", "Component: Text" and "Component: Video". By using these components as building blocks, one can compose a landing page consisting of a hero and a few sections with text and videos inside. Existing components are reusable. For example, the same Video component created for a landing page can be added to other pages.

As will be appreciated from the above, a complex webpage structure can be modeled using reusable content types. Content entries can be configured to reference each other in potentially deeply nested hierarchical structures that define a logical hierarchy of content entries for the CMS page. Such a logical hierarchy can be configured to mimic or approximate the logical arrangement of content for a webpage in some implementations. While the graphical arrangement of content displayed through the webpage may be constructed in various ways, the logical arrangement and relationships of content for the webpage can be defined, at least in part, by the logical arrangement of content entries in the CMS page. It will be appreciated that while a single CMS page has been described, there can be any number of CMS pages in a given environment. Further, a given content entry of a CMS page may in turn reference another CMS page, e.g. by referencing a page definition entry for another CMS page.

It is recognized that it can be important when describing a content model to differentiate between references that exist because they are pointers to objects that are inside (or internal to) the current object, or references that exist because they point to other objects for other purposes and that are not components of the current object (i.e. that are external to the current object). In other words, it can be important to understand what is part of the CMS page as opposed to what is merely referenced from the CMS page. For example, there is a difference between a link to a sub-element of the CMS page versus a link to another CMS page. The former is an example of a parent-child link relationship whereas the latter is an example of a peer-peer link relationship. Thus, references may be of a parent-child relationship or of a peer-peer relationship (two elements at the same level of logic), and the two types of relationship are distinguishable. In implementations of the present disclosure, references to objects that are considered internal to the CMS page are deemed to be in a composition relationship with the CMS page, whereas references to objects that are considered external to the CMS page are deemed to not be in a composition relationship with the CMS page.

Figure 6A:
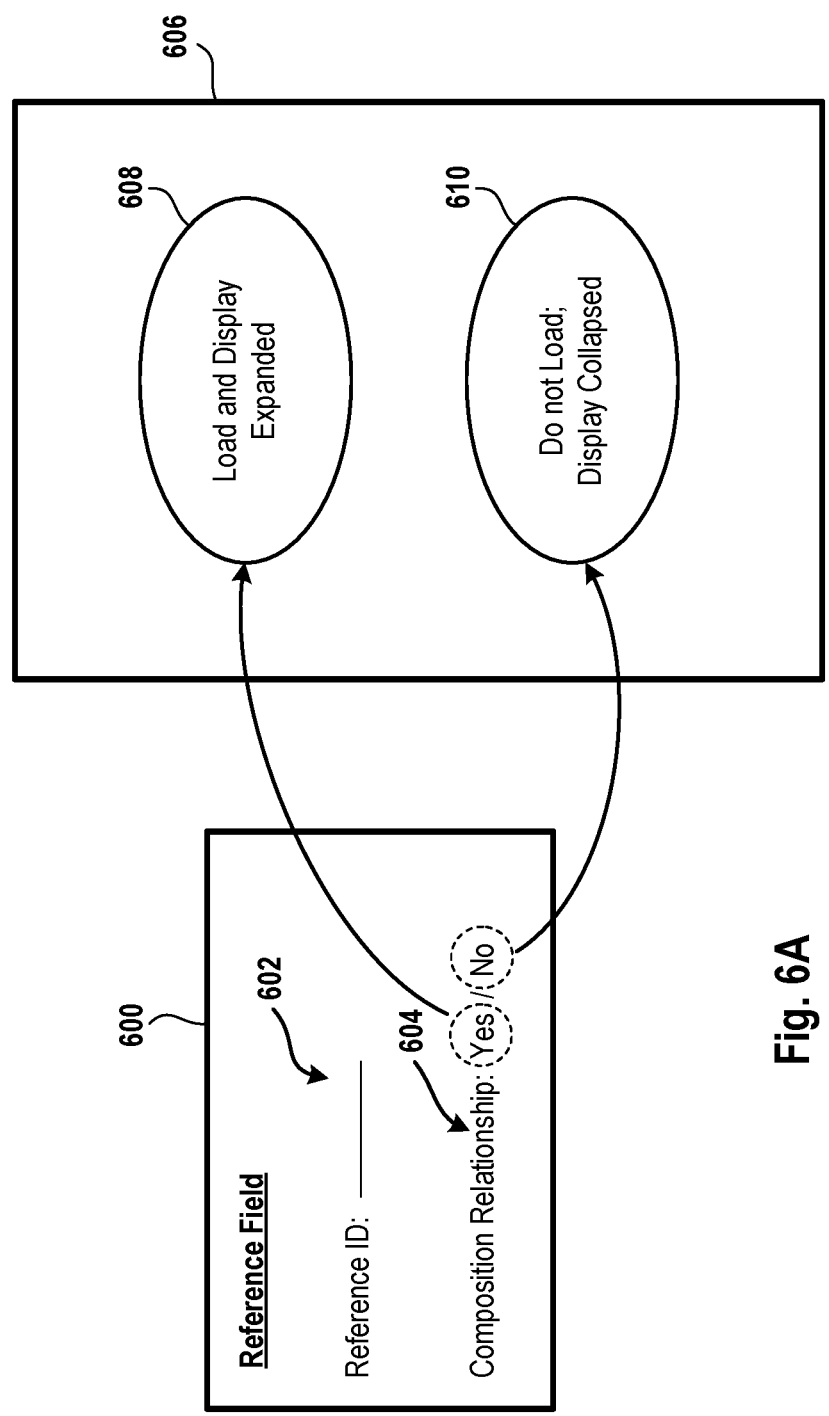
FIG. 6A conceptually illustrates a reference field having a compositional attribute to distinguish between references that are compositional and non-compositional (i.e. in a composition relationship or not), in accordance with implementations of the disclosure.

FIG. 6A conceptually illustrates a reference field having a compositional attribute to distinguish between references that are compositional and non-compositional (i.e. in a composition relationship or not), in accordance with implementations of the disclosure.

As shown, an example reference field 600, which can be included in a given content entry, includes a reference identifier 602 and further includes a composition relationship attribute 604. The composition relationship attribute 604 is set to define whether or not the given reference defined by the reference identifier 602 is to an object that is compositional to (considered part of or internal to) the current CMS page or non-compositional to (considered not part of or external to) the current CMS page.

The composition relationship attribute 604 can be used to define default settings for an editor UI 606 by which an editor accesses and edits the CMS page. As described in further detail below, in the case of a composition relationship existing, then default settings of the editor UI 606 can be configured to load the referenced object for editing and further graphically display the referenced object in an expanded configuration in a graphical tree/directory view (reference. 608). Whereas in the case of a composition relationship not existing, then default settings of the editor UI 606 can be configured to not load the referenced object for editing and further graphically display the referenced object in a collapsed configuration in the graphical tree/directory view (reference. 608). An example editor user interface as described further below will provide a clearer demonstration of these concepts.

FIG. 6B conceptually illustrates a content type having link type fields with associated composition attributes, in accordance with implementations of the disclosure.

A content type 620 is shown, from which one or more content entries can be defined. The content type 620 includes various fields 622, 624, 626, 628, and 632. The fields 622, 624, and 626, are non-link/reference fields, such as a text field, number field, boolean field, etc. The fields 628 and 632 are link fields that are defined to reference other entries or assets in the CMS. The link field 628 has an associated composition attribute 630 that defines whether or not the entry/asset that is referenced by the link field 628 is in a compositional relationship or a non-compositional relationship with the parent content entry (that would be defined from the content type 620). Similarly, the link field 632 has an associated composition attribute 634 that defines whether or not the entry/asset that is referenced by the link field 628 is in a compositional relationship or a non-compositional relationship with the parent content entry. It will be appreciated that the content type 620 can be configured to enable addition of any number of link fields to a corresponding content entry in some implementations.

While the implementation of a defined compositional/non-compositional relationship has been described in relation to a page content entry, it will be appreciated that such a compositional relationship can apply to any content type/entry having a link/reference field. The composition attribute can be defined and used for any type of content entry where it is useful to distinguish between referenced content that is internal to the content entry versus external to the content entry.

Thus, the implementation of the composition attribute can be useful when designing a content model for any kind of entity that is composed of multiple elements. As an example, one might create a content type/entry for a product and define a compositional relationship for link fields that reference the product's components, but define a non-compositional relationship for link fields that reference other compatible products.

Figure 7A:
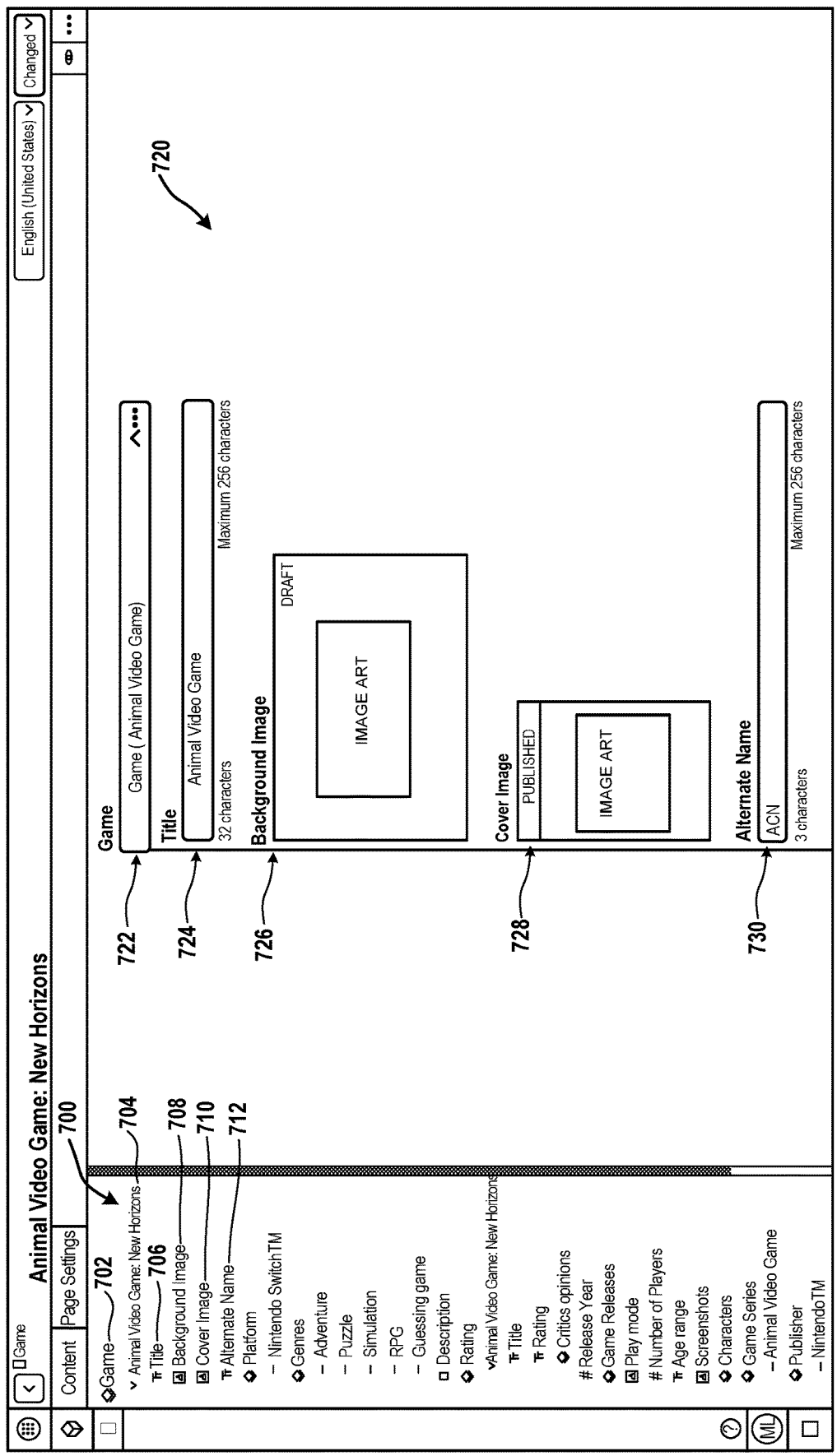
FIG. 7A illustrates an example editor user interface (UI) presented by an editor application accessing a CMS page, in accordance with implementations of the disclosure.

FIG. 7A illustrates an example editor user interface (UI) presented by an editor application accessing a CMS page, in accordance with implementations of the disclosure.

The editor UI includes a graphical tree/directory view 700 providing a hierarchically arranged listing of the content entries that define the CMS page. The graphical tree view 700 provides a graphical representation of the content entries, and illustrates logical relationships, in part via indentation as shown. The root entry for the CMS page in the illustrated implementation is the "Game" page definition entry 702. The content for the CMS page is defined from an "Animal Video Game" page content entry 704, that is referenced by the page definition entry 702.

The page content entry 704 includes several fields, including a "Title" field 706, a "Background Image" field 708, a "Cover Image" field 710, and an "Alternate Name" field 712.

Also included in the illustrated editor UI is an editing view 720 that is adjacent to the graphical tree view 700. The editing view 720 of the editor UI provides UI elements corresponding to the content entries of the graphical tree that further enable editing of specific content entries. In some implementations, the editing view 720 is in the form of a window or scrollable listing/context of editing elements that parallel the listing of content entries in the graphical tree. In the editing view 720, the page content entry 704 is denoted by a corresponding window heading 722.

The "Title" field 706 is editable in the editing view 720 via a corresponding "Title" section 724, including a text entry box as shown for editing the field. The "Background Image" field 708 is editable in the editing view 720 via a corresponding "Background Image" section 726, which as shown illustrates the currently designated background image, which may be changed if desired. The "Cover Image" field 710 is editable in the editing view 720 via a corresponding "Cover Image" section 728, which as shown illustrates the currently designated cover image, which may be changed if desired. The "Alternate Name" field 712 is editable in the editing view 720 via a corresponding "Alternate Name" section 730, including a text entry box as shown for editing the field.

Figure 7B:
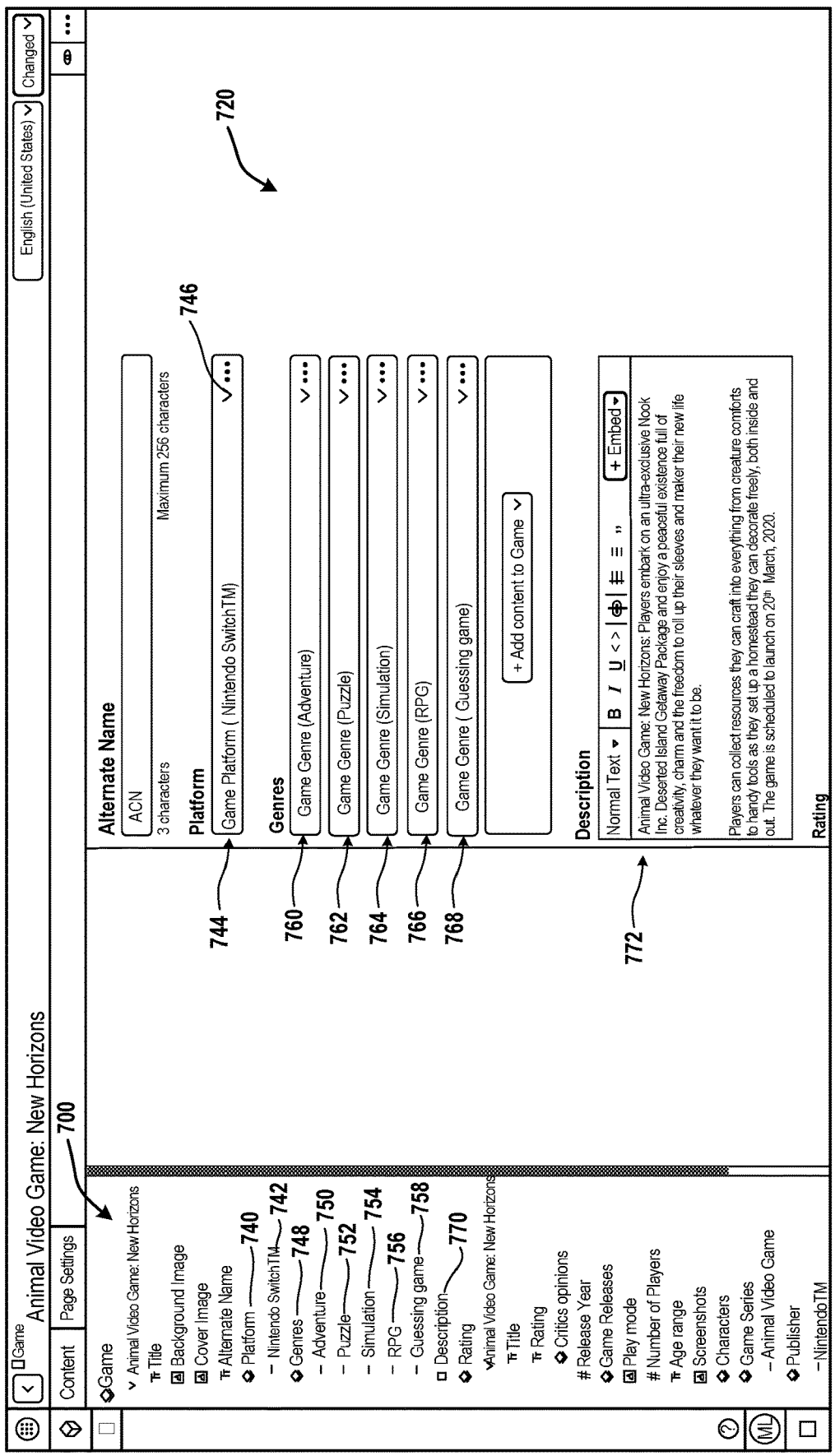
FIG. 7B illustrates the editor UI with the editor view 720 scrolled to reveal additional sections, in accordance with the implementation of FIG. 7A.

FIG. 7B illustrates the editor UI with the editor view 720 scrolled to reveal additional sections, in accordance with the implementation of FIG. 7A.

Shown in the graphical tree view 700 is a "Platform" field 740 that is a link/reference field that references another entry. More specifically as shown, the "Platform" field 740 references a "Nintendo Switch™" entry 742. As described above, the field 740 identifies the referenced entry 742, but also includes a composition attribute defining whether or not the referenced entry 742 is in a composition relationship with the CMS page. In this case, the composition attribute is set such that the referenced entry 742 is not in a composition relationship with the CMS page. As a result, the entry 742 is not shown in the graphical tree view 700 in an expanded view that would reveal its constituent fields, but is shown in a collapsed/contracted view by default (e.g. upon initial loading of the editor UI for viewing by an editor). In some implementations, the entry 742 can be manually expanded by, for example, clicking on the entry 742 or an associated icon/button that then causes expansion of the entry 742 to show its constituent fields in the graphical tree view 700. In some implementations, this may also trigger expansion of the corresponding section in the editor view 720. In other implementations, the entry 742 cannot be manually expanded by clicking in the graphical tree view 700, but is expandable via the editor view 720 as described below, such that enabling editing of the entry in the editor view 720 triggers expansion of the corresponding entry in the graphical tree view 700.

With continued reference to the default configuration shown at FIG. 7B, in the editor view 720, the corresponding "Platform" section is shown, including the "Nintendo Switch™" window heading 744 presented by default in a collapsed configuration indicating that the "Nintendo Switch™" entry has not been loaded for editing. While not loaded/expanded by default, the entry can be manually expanded/loaded if desired by the editor. For example, the "Nintendo Switch™" entry can be loaded for editing, and expanded to reveal its constituent fields, by clicking on an expansion icon/button 746 (e.g. a caret in the illustrated implementation). However, by default the entry has not been loaded for editing, as it is not in a composition relationship with the CMS page.

Returning to the graphical tree view 700, another example of a reference field is the "Genres" field 748, which as shown contains references to an "Adventure" entry 748, a "Puzzle" entry 752, a "Simulation" entry 754, an "RPG entry 756, and a "Guessing game" entry 758. These referenced entries are defined as having a non-compositional relationship to the CMS page, and accordingly are shown by default in collapsed configurations. Similarly, their corresponding editing windows 760, 762, 764, 766, and 768 are shown in the editing view 720 in collapsed configurations by default. However, it will be appreciated that these entries can be loaded for editing similar to that described above, which will cause expanded views to be rendered in the graphical tree view 700 and the editing view 720.

Additionally shown in the graphical tree view 700 is a "Description" field 770, which is editable in the editing view 720 via a corresponding "Description" section 772 having a text entry editor box as shown.

Figure 7C:
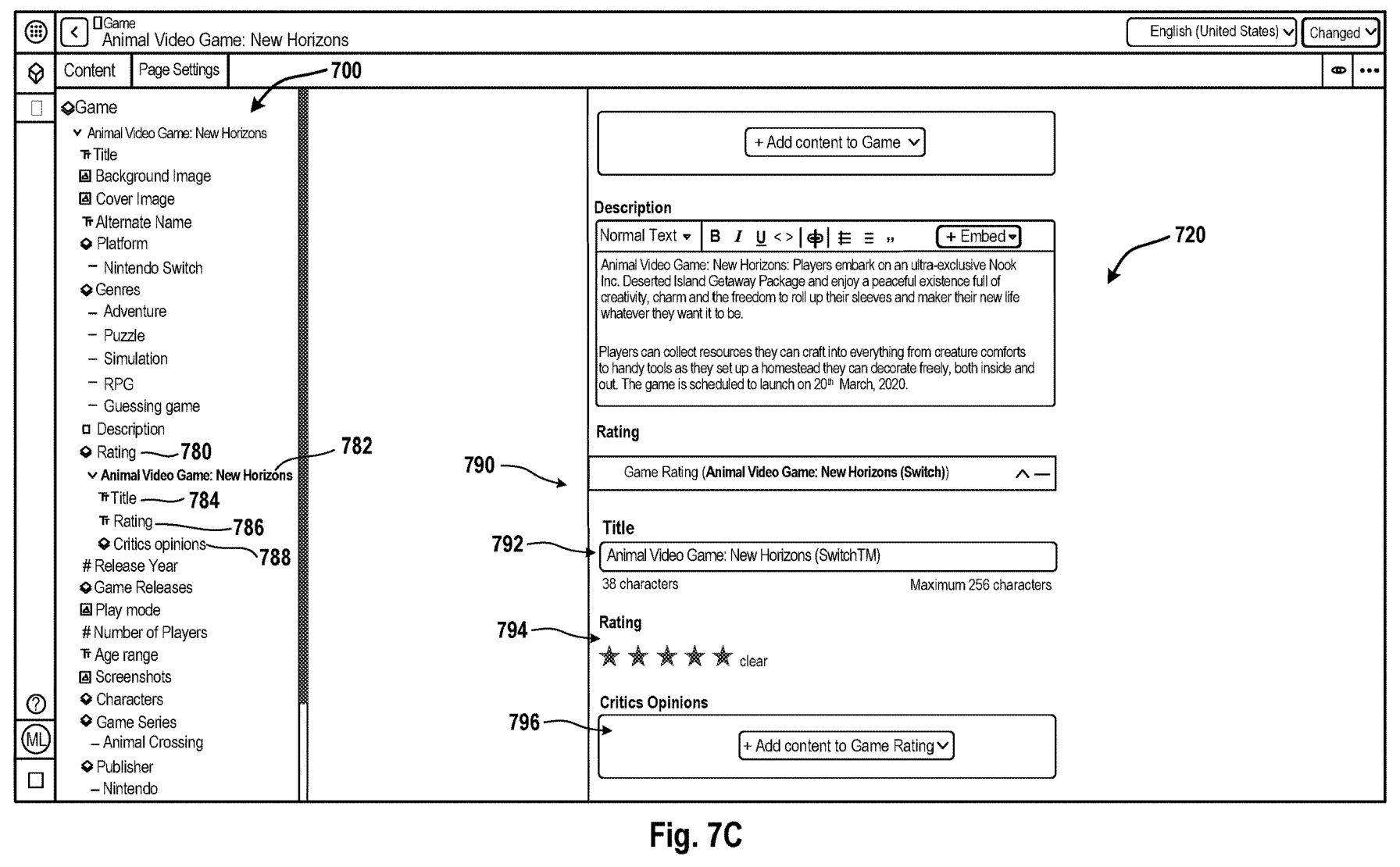

FIG. 7C illustrates the editor UI with the editor view 720 scrolled to reveal additional sections, in accordance with the implementations of FIGS. 7A and 7B.

Shown in the graphical tree view 700 is a "Rating" field 780 that is a reference/link field that references an "Animal Video Game" Game Rating entry 782. The composition attribute for the reference to the entry 782 is set to indicate a compositional relationship, and accordingly, by default the entry 782 is displayed in the graphical tree view 700 in an expanded configuration, showing the fields of the entry 782 which include a "Title" field 784, a "Rating" field 786, and "Critics opinions" field 788 (that is configured to reference additional entries).

Likewise, in the editing view 720, the corresponding editing window 790 for the entry 782 is displayed by default in an expanded configuration, with the fields of the entry 782 having been loaded for editing. As shown, these include a "Title" section 792 for editing the "Title" field 784, a "Rating" section 794 for editing the "Rating" field 786, and a "Critics opinion" section 796 for editing the "Critics opinion" field 788. It will be appreciated that the "Critics opinion" field 788 is configured to include references to other entries, which may be designated to be in a compositional or non-compositional relationship, which will thereby determine whether or not the referenced entries will by default be loaded and rendered in expanded configurations in the graphical tree view 700 and the editor view 720.

Accordingly, it will be appreciated that by providing a graphical tree view along with an editing view as shown and described, an intuitive editing experience can be provided that enables editors to better appreciate the context of a given element that they are editing. The logical relationship of the element to other elements of the CMS page is illustrated for the editor by the graphical tree. Further, elements of the CMS page are more directly accessible through the graphical tree. For example, in some implementations, selection of a given element (e.g. a particular field or entry) displayed in the graphical tree causes automatic scrolling of the editing view to the corresponding section or editing window to enable editing of the selected element. This improves efficiency of the editing experience for the editor, as the editor is not required to navigate through individual hops along the hierarchy of the CMS page, but can instead directly jump to a given element. This also provides benefits by reducing resource utilization by avoiding such step-wise navigation.

In some implementations, the graphical tree is configured to display indicators for validation errors. For example, fields displayed in the tree that have validation errors can be highlighted or marked in some manner (e.g. via graphical indicator, font attribute (e.g. bold, different color, highlighting, etc.), asterisk, etc.) so as to call attention to such fields. This makes it easy for editors to identify and fix missing or invalid content or formatting.

Further, through the use of the composition attribute to define whether an object is internal or external to the CMS page, then a more intuitive and efficient editing experience is provided. For example, references that are children of the CMS page can be displayed by default in an expanded configuration, whereas references that are not children of the CMS page can be displayed by default in a collapsed/contracted configuration, enabling an editor to easily distinguish between the two types of references, and also focus on those elements that are compositional to the CMS page for editing purposes. As an example, a link to another page may be considered non-compositional to the CMS page, and is therefore shown collapsed by default.

Figure 8:
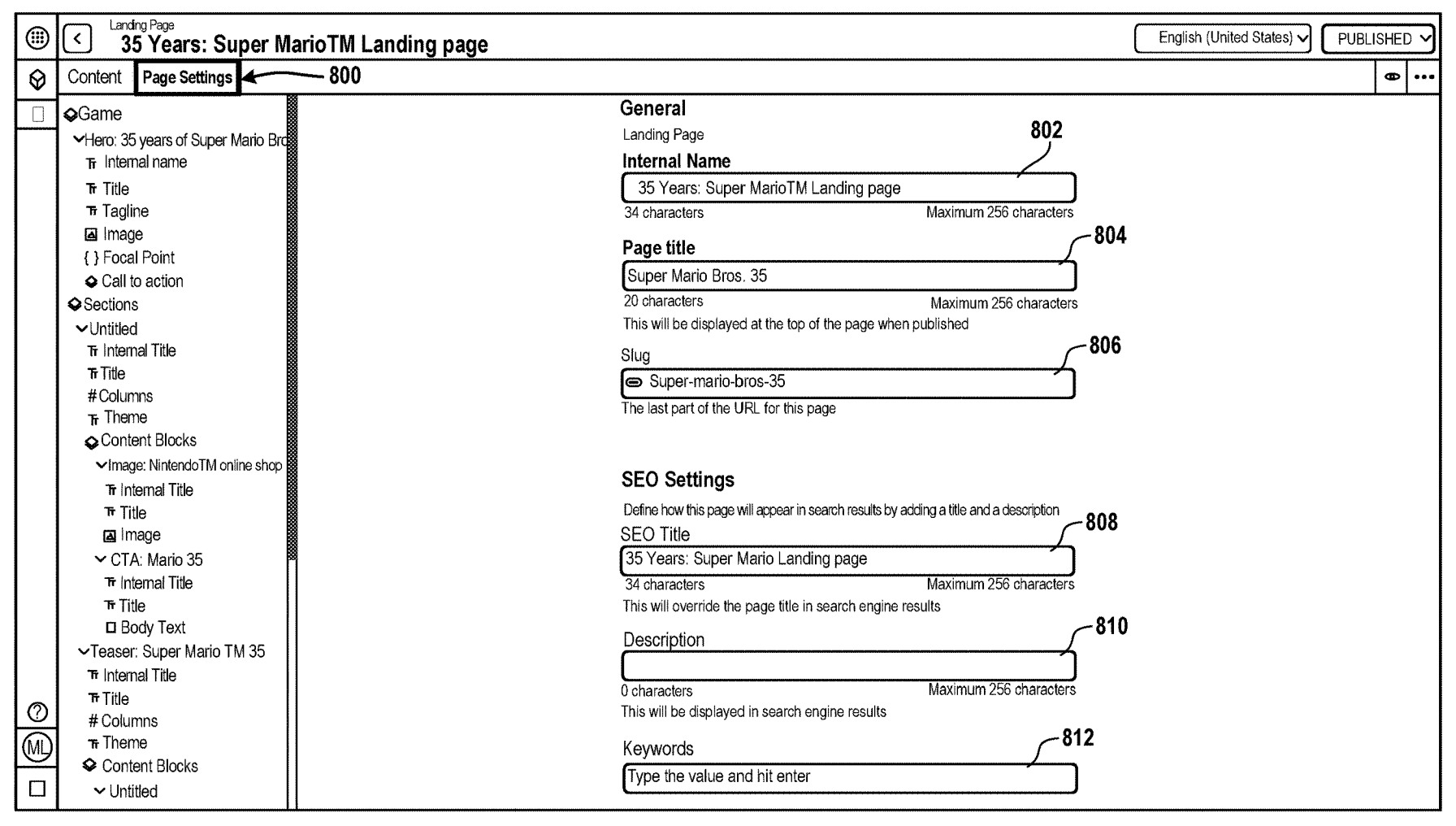

FIG. 8 illustrates an editor UI view of page settings for a CMS page, in accordance with implementations of the disclosure.

In the illustrated implementation, a "Page Settings" tab 800 is shown in the editor UI. Certain editable settings are provided from the page definition entry and the SEO metadata entry for the CMS page. For example, the "Internal name" field is editable via a text entry box 802. The "Page title" field is editable via the text entry box 804. The "Slug" field is editable via the text entry box 806. In some implementations, an initial value of the "Slug" field is automatically generated based on the "Page title" field.

Certain editable settings are also provided from the SEO metadata entry for the CMS page. For example, the "SEO Title" field is editable via a text entry box 808. The "Description" field is editable via the text entry box 810. And the "Keywords" field is editable via the text entry box 812.

Figure 9:
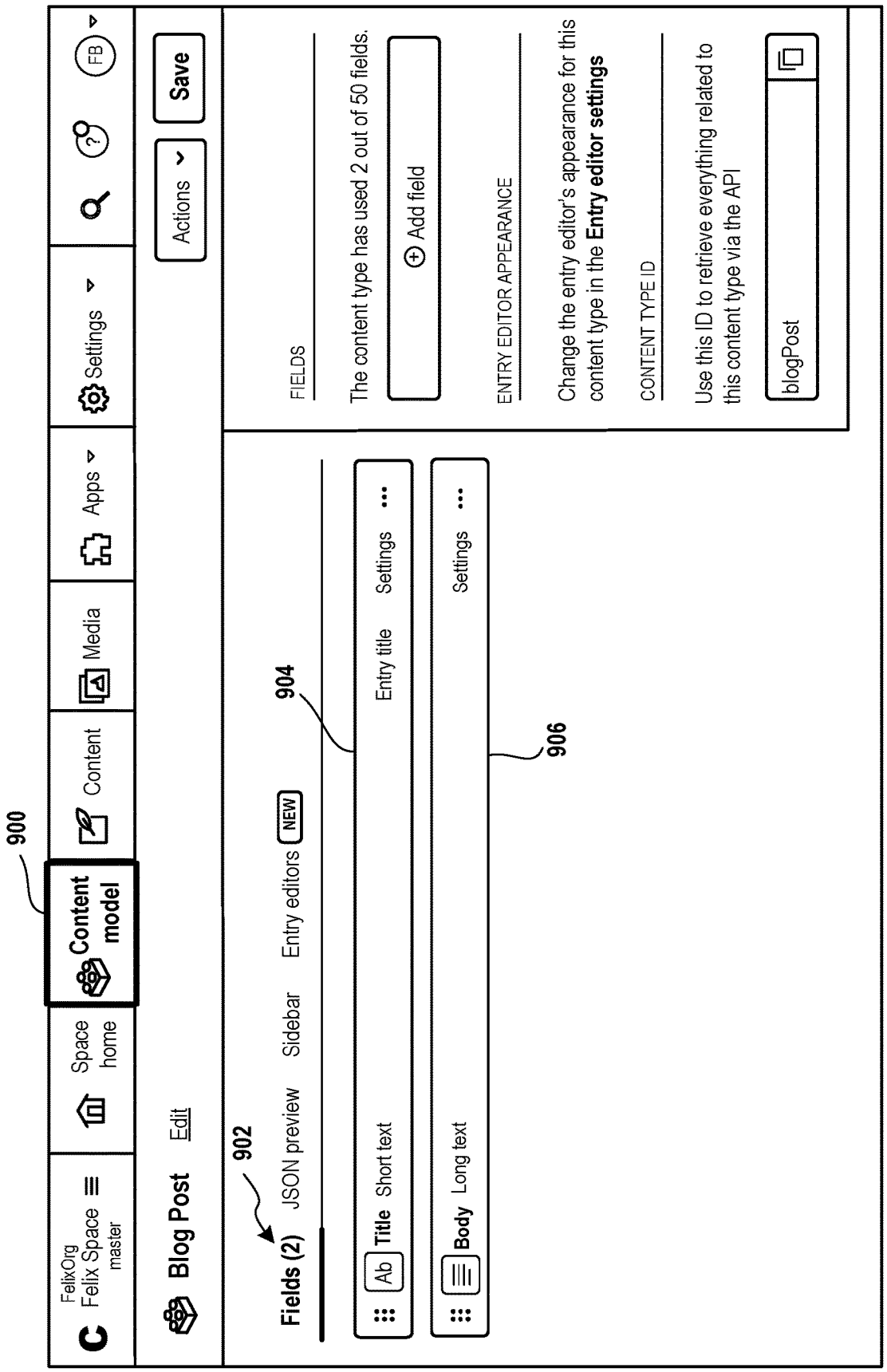
FIG. 9 illustrates an interface view of a Content model tab 1100 of a CMS editorial application, in accordance with implementations of the disclosure.

FIG. 9 illustrates an interface view of a Content model tab 1100 of a CMS editorial application, in accordance with implementations of the disclosure.

In the illustrated implementation, a view of a "Blog Post" type is shown, with the Fields 902 of the type being currently displayed. As shown, the "Blog Post" type includes a Title field 904 and a Body field 906.

FIG. 10 illustrates an interface view of a Content tab 1000 of a CMS editorial application, in accordance with implementations of the disclosure.

In the illustrated implementation, a listing of content entries 1002 for a given space environment is shown, including the name, the date the entry was last updated, the author, and the status (e.g. published, unpublished, etc.). The listing of content entries can be filtered by content type, or searched. A listing of content types 1004 is also shown.

Figure 11:
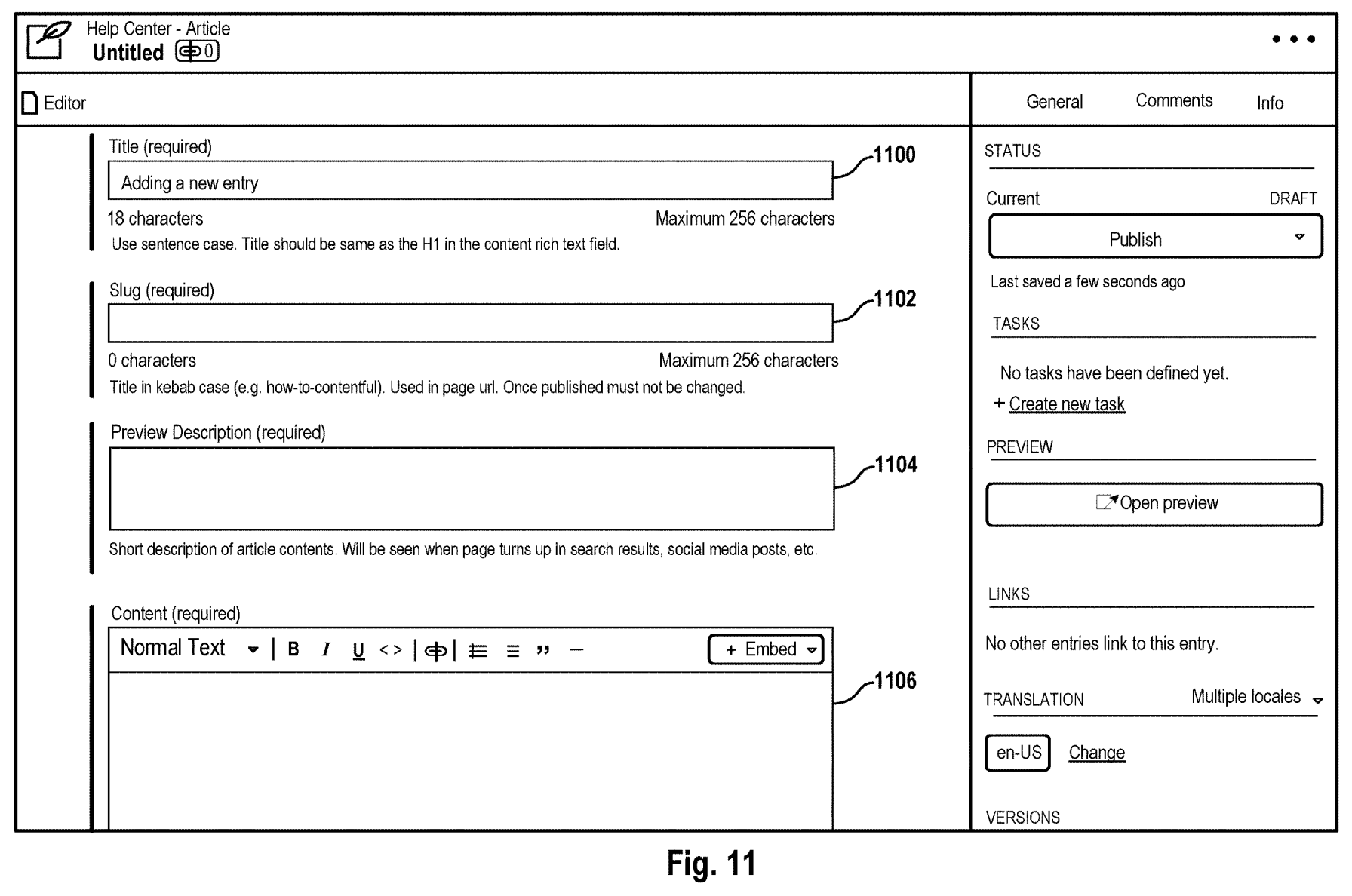

FIG. 11 illustrates an interface view of an entry editor of a CMS editorial application for adding a new entry to a content project/environment, in accordance with implementations of the disclosure.

In the illustrated implementation, the entry being edited is of a "Help Center—Article" type, and accordingly has certain predefined fields which are fillable/editable to compose the entry. As shown, these fields include a Title field 1100, Slug field 1102, Preview Description field 1104, and Content field 1106, which are editable via the illustrated text entry boxes.

FIG. 12 illustrates an interface view of a Media tab 1200 of a CMS editorial application, in accordance with implementations of the disclosure.

In the illustrated implementation, a listing of assets 1202 is shown, including various information displays such as a preview thumbnail, name, dimensions, type, when the asset was last updated, by whom, and status. Various file types are supported, including attachment, plain text, image, audio, video, and rich text.

Figure 13:
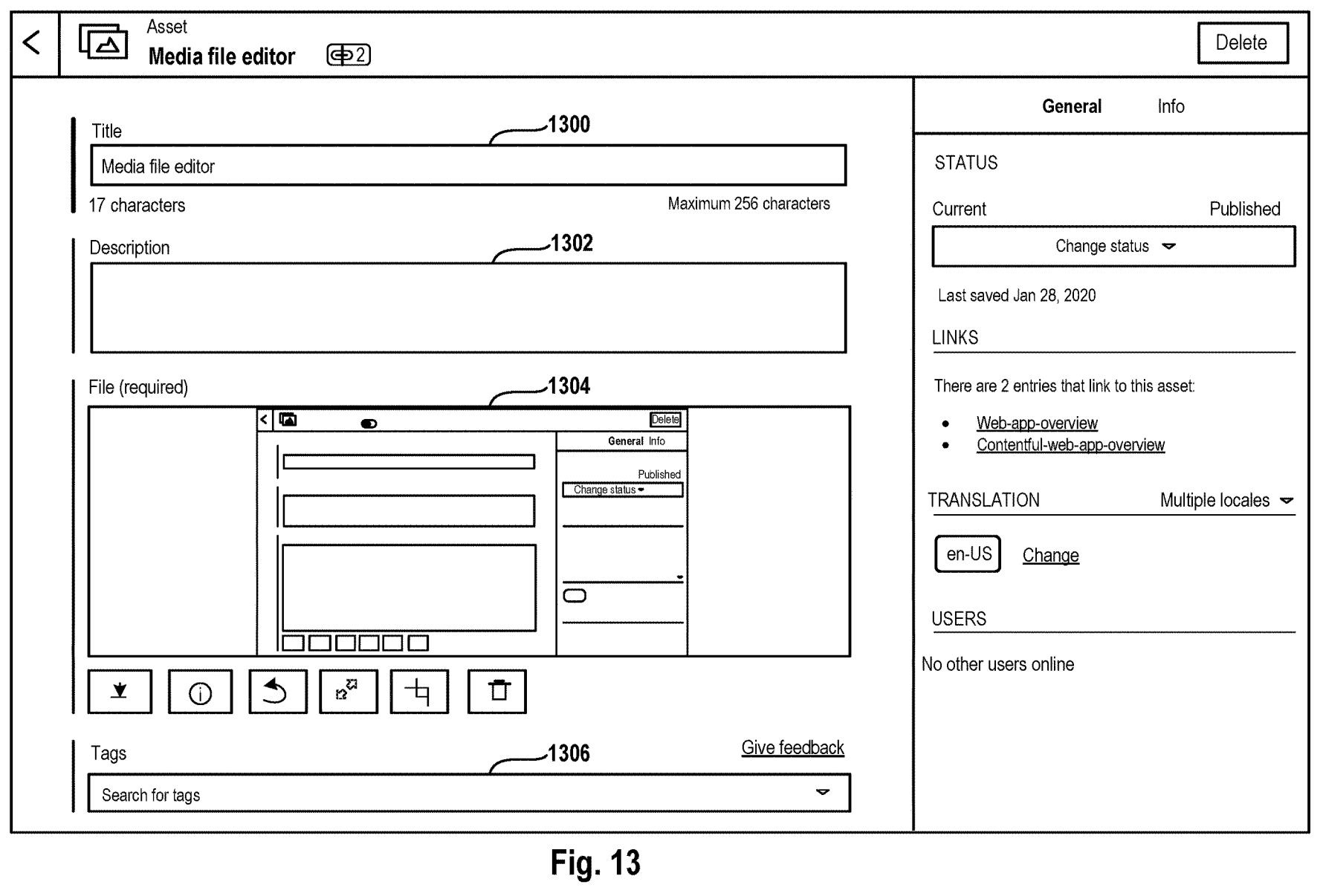

FIG. 13 illustrates an interface view of an Asset editor of a CMS editorial application for editing an Asset, in accordance with implementations of the disclosure.

In the illustrated implementation, various definitional fields for the asset as shown, including a Title 1300, Description 1302, File 1304, and Tags 1306.

Traditional content management systems, e.g., like Wordpress™ and Sitecore™ were designed to store and present content elements like text, images and video on websites. That is, the traditional CMS approach is to managing content in one big bucket, i.e., content, images, HTML, CSS. Unfortunately, this made it impossible to reuse the content because it was commingled with code. As digital platforms have evolved, the need for more flexible solutions emerged. For instance, enterprises are now developing websites, mobile sites, apps, digital displays, conversational interfaces and more. Meanwhile, the traditional CMS organizes content in webpage-oriented frameworks, making it impossible for the same content to adapt to other digital platforms.

In one embodiment, the content management system (CMS) of the described embodiments is a headless CMS. A headless CMS functions as a "content" repository, where the content is separated or decoupled from the presentation layer head. Because of this decoupling, the content is not page-based. As described above, aspects of the headless CMS described herein provide for editors that allow for efficient structuring of content. The structuring of content enables for efficient management of said content and access to said content using specialized application specific interface (API) calls.

In one embodiment, the content infrastructure includes APIs for content management (e.g., content management API), previewing (e.g., content preview API), images (e.g., images API), and display (e.g., content delivery API), to deliver content to any application, platform, form factor, device, IOT, and website.

The content delivery API (CDA) is a read-only API for delivering content from the CMA to apps, websites and other media. In one embodiment, content is delivered as JSON data, and images, videos and other media as files. In one embodiment, the CDA is available via a globally distributed content delivery network. By way of example, the server closest to the user serves all content, both JSON and binary. Serving from the closest server minimizes latency, which especially benefits mobile apps. In one embodiment, content of the CMS is hosted in multiple global data centers, which greatly improves the availability of content. In one configuration, the content management API (CMA) is a read-write API for managing content. Unlike the content delivery API, the content management API requires the user to be authenticated. In some embodiments, the CMA may be used in several use cases, such as automatic imports from WordPress™, Drupal™, and other apps. In other embodiments, the CMA may be integrated with other backend systems, such as an e-commerce shop.

The content preview API is a variant of the CDA for previewing your content before delivering for use by consuming applications (i.e., for display). For example, the content preview API may be used in combination with a "preview" deployment of a website (or a "preview" build of a mobile app) that allows content managers and authors to view their work in-context, as if it were published, using a "preview" access token as though it were delivered by the CDA.

The images API allows for resizing and cropping of images, changing image background colors and/or converting images to different formats. In one embodiment, using the images API for these transformations allows for upload of high-quality assets, delivering exactly what an app needs.

Figure 14:
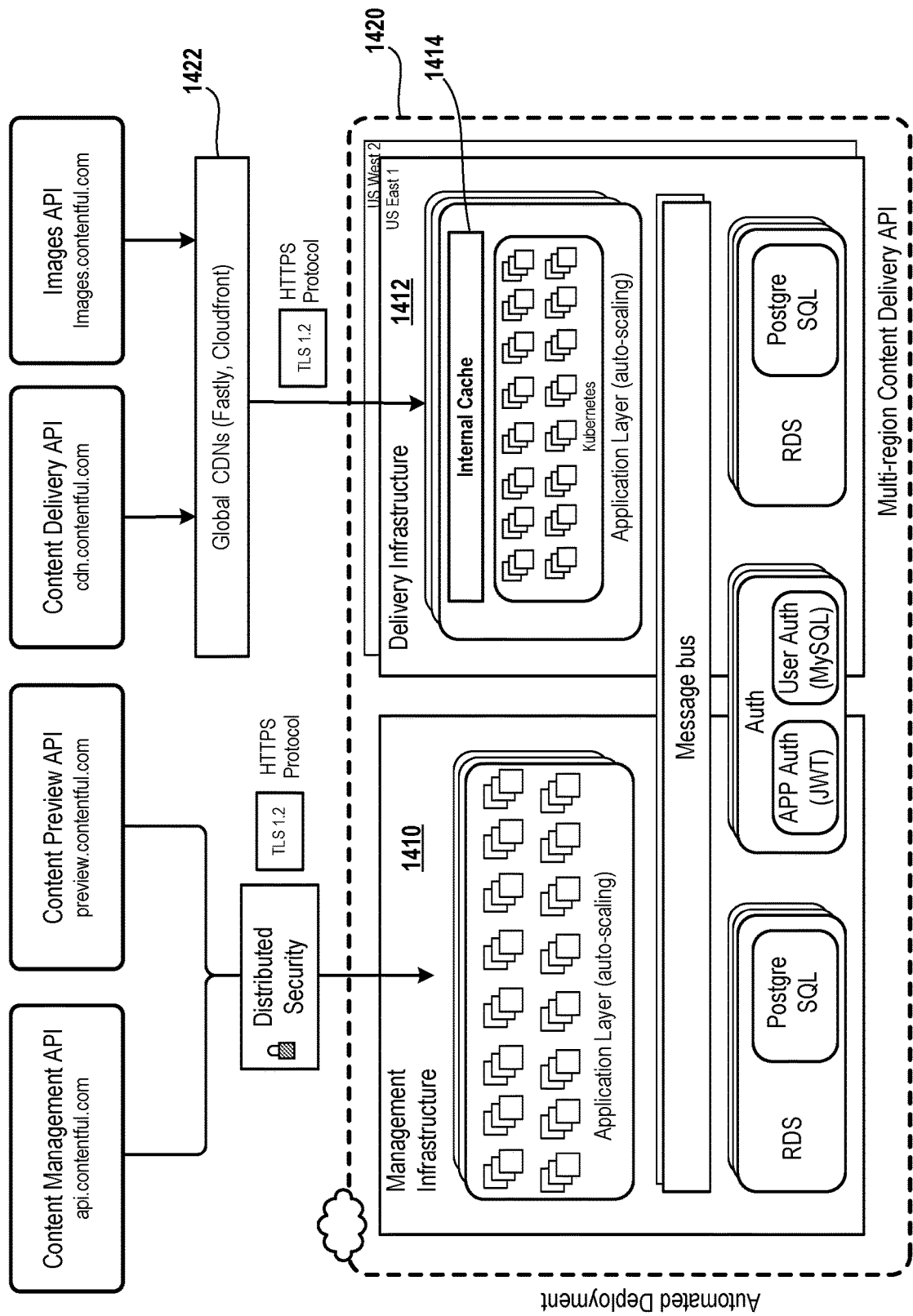
FIG. 14 illustrates an example of how a content management API (CMA) and a content preview API (CPA) can make calls to a content management system (CMS), in accordance with implementations of the disclosure.

FIG. 14 illustrates an example of how the content management API (CMA) and the content preview API (CPA) can make calls to the content management system (CMS) 1420. In one configuration, the CMS 1420 includes compute and storage resources for management of structured content. As described above, a web editor provides for a user interface (UI) that remote client device uses to access the CMS 1420. Based on the type of content creation and/or editing being performed via the UI of the web editor, either the CMA or CPA are used to make API calls to the management 1410 compute and storage resources. The compute and storage resources which run the CMS 1420, in one embodiment, are run in a cloud based environment. The cloud based environment, for example, may be provided by a cloud compute and storage servicing entity, e.g., such as Amazon Web Services (AWS)™, Google™ Cloud, Microsoft™ Azure™, or other serving entity. In some embodiments, these servicing entities are referred to as hosting services, which provide the hardware and internet connectivity to execute applications, processes, and workflows using various types of hardware configurations. In other embodiments, private cloud systems may be run instead of using third party hosting services. In some configurations, the hardware configurations may include virtualized hardware and expandable storage to meet the processing needs of the CMS 1420. Broadly speaking, the CMS 1420 is executed using cloud infrastructure, which includes the use of multiple interconnected data centers throughout the world.

In one configuration, the CMS 1420 also includes a delivery component 1412, which is configured to service processing operations from the content delivery API and the images API. As shown, in one embodiment, the delivery component 1412 is provisioned with internal cache 1414, which is optimized to interface with a global content delivery network (CDN), which in turn handles calls from the content delivery API and the images API. The CDN, in one embodiment, is a widely distributed service that enables rapid and efficient delivery of content to users throughout the world. In one embodiment, the delivery component 1412 is part of the CMS 1420, and is also executed on compute and storage of a cloud infrastructure. In one embodiment, structured content is prepared and/or edited using the management component 1410, before it is published for external consumption. By separating structured content in the cloud infrastructure, it is possible to prevent non-ready content to be accessed and delivered using the CDA.

Agents accessing the CMS 1420, including organizations, individual users, as well as APPs, are authenticated by an authentication and authorization system. In some implementations, user authentication uses MySQL. In some implementations, APP authentication uses JSON Web Tokens.

It should be apparent, that the present embodiments may be practiced without some or all of these specific details. Modification to the modules, code and communication interfaces are also possible, so long as the defined functionality for the content management system (CMS) or modules of the CMS maintained. In other instances, well-known process operations have not been described in detail in order not to unnecessarily obscure the present embodiments.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include solid state drives (SSDs), hard drives, network attached storage (NAS), read-only memory, random-access memory, persistent memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

The foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

What is claimed is:

1. A process for rendering a user interface for editing content of a content management system (CMS), comprising:
provided, over a network through a browser of a client device the user interface, the user interface is configured for editing a content page in the CMS;
presenting a graphical tree view in the user interface for editing the content page, the graphical tree view presents content components in accordance with a logical hierarchy of the content page, wherein each of said content components is selectable via the graphical tree view, wherein the graphical tree view represents said content components having attributes structured in accordance with a content model of the CMS, wherein the graphical tree view of the content page provides a parallel structure to content presentation of a website page that is separately hosted apart from the CMS, the website page is configured to implement application programming interface (API) calls to the CMS for accessing content edited for the content page, said edited content being included in the content presentation of the website page; and
presenting an editing view in the user interface responsive to selection of one of said plurality of content components from the graphical tree view, the editing view provides access to editing fields related to said selected content component;
wherein the editing view and the graphical tree view are presented simultaneously in the user interface, such that the editing view presented maintains a correlation to a relationship position of the selected content component in the logical hierarchy defined for the content page.

2. The process for rendering a user interface of claim 1, further comprising, determining for each content component a relationship of the content component to the content page;
identifying the content component as being external to the content page based on the relationship;
responsive to identifying the content component as being external to the content page, then restricting expansion of the graphical tree view for the content component.

3. The process for rendering a user interface of claim 1, further comprising, determining for each content component a relationship of the content component to the content page;
identifying the content component as being internal to the content page based on the relationship;
responsive to identifying the content component as being internal to the content page, then enabling expansion of the graphical tree view for the content component.

4. The process for rendering a user interface of claim 1, wherein the graphical tree view enables a selectable expansion view and a selectable contraction view, wherein the selectable expansion view when active presents one or more nested content components, and each of said nested content components is selectable;
wherein selection of a nested content component automatically presents the editing view that corresponds to the selected nested content component.

5. The process for rendering a user interface of claim 1, wherein the interface for editing the content page in the CMS is a graphical user interface that enables access to the graphical tree view of the content page for selecting one or more of the content components, and said selection of one of said content components causes rendering of the editing view alongside the graphical tree view.

6. The process for rendering a user interface of claim 5, wherein selection of another one of said content components causes updates to the editing view to relate to said other selected content component.

7. The process for rendering a user interface of claim 1, wherein the parallel structure of the content page to the content presentation of the website page exposes logical relationships between content components for when data associated with the content components is presented in the content presentation of the website page.

8. The process for rendering a user interface of claim 7, wherein the logical relationships are provided from said logical hierarchy defined for the content page, and wherein the logical hierarchy is updated over time when content components are added, removed or moved when editing the content page.

9. The process for rendering a user interface of claim 1, wherein the user interface of the CMS provides each of said editing views for respective content components for adding, arranging and inputting data using input controls provided by the editing views.

10. A process for rendering a user interface for editing content of a content management system (CMS), comprising:
providing, over a network through a browser of a client device the user interface, the user interface is configured for editing a content page in the CMS;
presenting a graphical tree view in the user interface for editing the content page, the graphical tree view presents content components in accordance with the logical hierarchy of the content page, wherein each of said content components is selectable via the graphical tree view, wherein the graphical tree view represents said content components having attributes structured in accordance with a content model of the CMS, wherein the graphical tree view of the content page provides a parallel structure to content presentation of a website page that is separately hosted apart from the CMS, the website page is configured to implement application programming interface (API) calls to the CMS for accessing content edited for the content page, said edited content being included in the content presentation of the website page;
determining for each content component a relationship of the content component to the content page;
responsive to identifying the content component as being external to the content page based on the relationship, then restricting expansion of the graphical tree view for the content component; and
responsive to identifying the content component as being internal to the content page based on the relationship, then enabling expansion of the graphical tree view for the content component.

11. The process for rendering a user interface of claim 10, wherein when the content component is external to the content page, the content component is expandable via an editing view of the CMS and not the graphical tree view of the content page.

12. The process for rendering a user interface of claim 10, further comprising: presenting an editing view in the user interface, the editing view is configured to provide access to editing fields related to the content component;
further responsive to the identifying the content component as being external to the content page based on the relationship, then restricting expansion of the editing view for the content component;
further responsive to the identifying the content component as being internal to the content page based on the relationship, then enabling expansion of the editing view for the content component.

13. The process for rendering a user interface of claim 12, wherein the editing view and the graphical tree view are presented simultaneously in the user interface, such that the editing view presented maintains a correlation to a relationship position of the content component in the logical hierarchy defined for the content page.

14. The process for rendering a user interface of claim 10, wherein the graphical tree view enables a selectable expansion view and a selectable contraction view, wherein the selectable expansion view when active presents one or more nested content components, and each of said nested content components is selectable to automatically present an editing view that corresponds to the selected nested content component.

15. The process for rendering a user interface of claim 10, wherein restricting expansion of the graphical tree view for the content component is applied to a default presentation mode of the graphical tree view.

16. The process for rendering a user interface of claim 10, wherein restricting expansion of the graphical tree view for the content component prevents said expansion when the content component is accessed via the tree view.

17. A process for rendering a user interface for editing content of a content management system (CMS), comprising:
providing, over a network through a browser of a client device the user interface, the user interface is configured for editing a first content entry in the CMS, said first content entry having a plurality of fields, the plurality of fields including a reference field that is configured to include a reference to a second content entry in the CMS;
wherein the reference field further includes an attribute that sets a compositional or non-compositional relationship between the second content entry and the first content entry, wherein the attribute defines a default setting for a graphical tree view of the interface;
wherein the graphical tree view of the content page provides a parallel structure to content presentation of a website page that is separate from the CMS, wherein the website page is configured to implement application programming interface (API) calls to the CMS for accessing content edited via the user interface;
responsive to the attribute being set as a non-compositional relationship, then restricting expansion of the graphical tree view for the second content entry in the user interface; and
responsive to identifying the attribute being set as a compositional relationship, then enabling expansion of the graphical tree view for the second content entry in the user interface.

18. The process for rendering a user interface of claim 17, further comprising:
presenting an editing view in the user interface, the editing view is configured to provide access to editing the plurality of fields of the first content entry;
further responsive to the attribute being set as a non-compositional relationship, then restricting expansion of the editing view for the second content entry;
further responsive to the attribute being set as a compositional relationship, then enabling expansion of the editing view for the second content entry.

19. The process for rendering a user interface of claim 18, wherein the editing view and the graphical tree view are presented simultaneously in the user interface, such that the editing view presented maintains a correlation to a relationship position of the first content entry in a logical hierarchy displayed by the graphical tree view.

* * * * *